US012444829B2

(12) United States Patent
Son et al.

(10) Patent No.: US 12,444,829 B2
(45) Date of Patent: Oct. 14, 2025

(54) ELECTRONIC DEVICE INCLUDING ANTENNA

(71) Applicant: SAMSUNG ELECTRONICS CO., LTD., Suwon-si (KR)

(72) Inventors: Wangik Son, Suwon-si (KR); Jungsik Park, Suwon-si (KR); Incheol Baek, Suwon-si (KR); Sunghyup Lee, Suwon-si (KR); Dongwoo Seo, Suwon-si (KR); Youngsoo Chun, Suwon-si (KR); Byengsang Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 139 days.

(21) Appl. No.: 18/521,234

(22) Filed: Nov. 28, 2023

(65) Prior Publication Data

US 2024/0178548 A1 May 30, 2024

Related U.S. Application Data

(63) Continuation of application No. PCT/KR2023/019314, filed on Nov. 28, 2023.

(30) Foreign Application Priority Data

Nov. 28, 2022 (KR) ........................ 10-2022-0161828
Jan. 4, 2023 (KR) ........................ 10-2023-0001422

(51) Int. Cl.
*H01Q 1/24* (2006.01)
*H01Q 9/04* (2006.01)

(52) U.S. Cl.
CPC ............ *H01Q 1/241* (2013.01); *H01Q 9/045* (2013.01)

(58) Field of Classification Search
CPC ............ H01Q 1/38; H01Q 1/42; H01Q 1/241; H01Q 1/243; H01Q 9/045; H01Q 13/10; H01Q 21/08; H01Q 21/28
See application file for complete search history.

(56) References Cited

U.S. PATENT DOCUMENTS 10,530,043 B2 * 1/2020 Liu .......................... H01Q 9/40
11,462,829 B2 * 10/2022 Li .......................... H01Q 5/314
(Continued)

FOREIGN PATENT DOCUMENTS

CN 107968255 A 4/2018
CN 114069222 A 2/2022
(Continued)

OTHER PUBLICATIONS

International Search Report and Written Opinion corresponding to Application No. PCT/KR2023/019314; Filing Date: Nov. 28, 2023; Mailing date: Mar. 4, 2024.

*Primary Examiner* — Tung X Le
(74) *Attorney, Agent, or Firm* — CANTOR COLBURN LLP

(57) ABSTRACT

An electronic device includes a housing, a circuit board, a first electronic component, a first conductive plate, and a first antenna. The housing includes a support member and a side frame surrounding a periphery of the support member. The support member includes a first conductive area. The circuit board is disposed on a surface of the support member and includes a feeding point on a surface of the circuit board. The first electronic component is disposed on the surface of the support member. The first conductive plate is disposed on a surface of the first electronic component. The first conductive area is disposed between the first electronic component and the side frame. The first antenna includes a first radiator, a first feeding part, and a first signal terminal.
(Continued)

At least a portion of the first electronic component is disposed between the first conductive area and the circuit board.

20 Claims, 13 Drawing Sheets

(56) References Cited

U.S. PATENT DOCUMENTS

| | | | | |
|---|---|---|---|---|
| 2015/0303557 | A1 | 10/2015 | Kim et al. | |
| 2016/0301139 | A1* | 10/2016 | Lombardi | H01Q 1/42 |
| 2017/0201010 | A1* | 7/2017 | Kim | H01Q 9/42 |
| 2019/0214714 | A1* | 7/2019 | Chen | H01Q 5/371 |
| 2019/0348750 | A1* | 11/2019 | Lin | H01Q 9/42 |
| 2020/0007184 | A1* | 1/2020 | Jung | H04B 1/525 |
| 2020/0014093 | A1 | 1/2020 | Kim et al. | |
| 2020/0343623 | A1 | 10/2020 | Guan | |
| 2021/0028543 | A1 | 1/2021 | Yeom et al. | |
| 2022/0037791 | A1 | 2/2022 | Li | |
| 2022/0085488 | A1 | 3/2022 | Irci et al. | |
| 2022/0384953 | A1 | 12/2022 | Shin et al. | |
| 2023/0336648 | A1 | 10/2023 | Lee et al. | |

FOREIGN PATENT DOCUMENTS

| | | | |
|---|---|---|---|
| KR | 20150119748 | A | 10/2015 |
| KR | 101961378 | B1 | 3/2019 |
| KR | 20190090870 | A | 8/2019 |
| KR | 102168317 | B1 | 10/2020 |
| KR | 1020210012320 | A | 2/2021 |
| KR | 20210101590 | A | 8/2021 |
| KR | 20220017128 | A | 2/2022 |
| KR | 20220089344 | A | 6/2022 |

* cited by examiner

ELECTRONIC DEVICE INCLUDING ANTENNA

CROSS-REFERENCE TO RELATED APPLICATION(S)

This application is a continuation application, claiming priority under § 365(c), of International Application No. PCT/KR2023/019314, filed on Nov. 28, 2023, which is based on and claims the benefit of Korean Patent Application No.: 10-2023-0001422, filed on Jan. 4, 2023, and Korean patent application number 10-2022-0161828, filed on Nov. 28, 2022, the contents of which in their entirety are herein incorporated by reference.

BACKGROUND

Field

Embodiments of the disclosure relate to an antenna assembly and an electronic device including the same.

Description of the Related Art

An electronic device may refer to a device that performs a specific function according to a loaded program on board, such as a home appliance, an electronic notebook, a portable multimedia player, a mobile phone, a tablet PC, a video/audio device, a desktop/laptop computer, or a car navigation system. For example, the electronic devices may output stored information as sound or an image.

With increases in the demand for mobile communications and the integration level of electronic devices, various technologies are under development to improve the portability of electronic devices and enhance user convenience in using a multimedia function and other functions. An electronic device may include an antenna device that provides wireless communications in various frequency bands. The antenna device may provide the electronic device with communication performance of stable quality under a commercialized wireless communication network environment by providing a high gain and wide beam coverage. In recent years, millimeter wave communications in a frequency band of tens of GHz or more (e.g., a high frequency band at or above 28 GHz) have been used to address the rapid growth of mobile traffic and meet demands for increasing communications traffic, in addition to some mobile communications (e.g., $2^{nd}$ generation (2G)/$3^{rd}$ generation (3G)/$4^{th}$ generation (4G)/universal mobile telecommunications system (UMTS)/long term evolution (LTE)) in low/medium/high-frequency bands at or below a few GHz supporting multiple bands, and communications such as Bluetooth, wireless fidelity (Wi-Fi), near field communication (NFC), global positioning system (GPS), and ultra wide band (UWB).

The above information is presented as background information only to assist with an understanding of the disclosure. No determination has been made, and no assertion is made, as to whether any of the above might be applicable as prior art with regard to the disclosure.

SUMMARY

An embodiment of an electronic device according to the disclosure includes a housing, a circuit board, a first electronic component, a first conductive plate, and/or a first antenna. The housing includes a support member and a side frame surrounding a periphery of the support member. The support member includes two surfaces facing opposite directions. The support member includes a first conductive area in at least a portion of the support member. The circuit board is disposed on a surface of the support member and includes at least one feeding point on a surface of the circuit board. The first electronic component is disposed on the surface of the support member. The first conductive plate is disposed on a surface of the first electronic component.

The first conductive area is disposed between the first electronic component and the side frame, and the first conductive area includes a first slot in at least a portion of the first conductive area. The first antenna includes a first radiator, a first feeding part, and the first signal terminal. The first radiator includes at least a portion of the first conductive area, and the portion of the first conductive area includes a peripheral portion of the first slot. The first feeding part is coupled with the first conductive plate and electromagnetically coupled to the first radiator. The first signal terminal is coupled with the first conductive plate and electrically connected to the feeding point. At least a portion of the first electronic component is disposed between the first conductive area and the circuit board.

BRIEF DESCRIPTION OF DRAWINGS

The above and other aspects, features, and/or advantages of an embodiment of the disclosure will be more apparent from the following description taken in conjunction with the accompanying drawings.

Similar reference numerals may be assigned to similar parts, components, and/or structures throughout the accompanying drawings.

DETAILED DESCRIPTION

Figure 1:
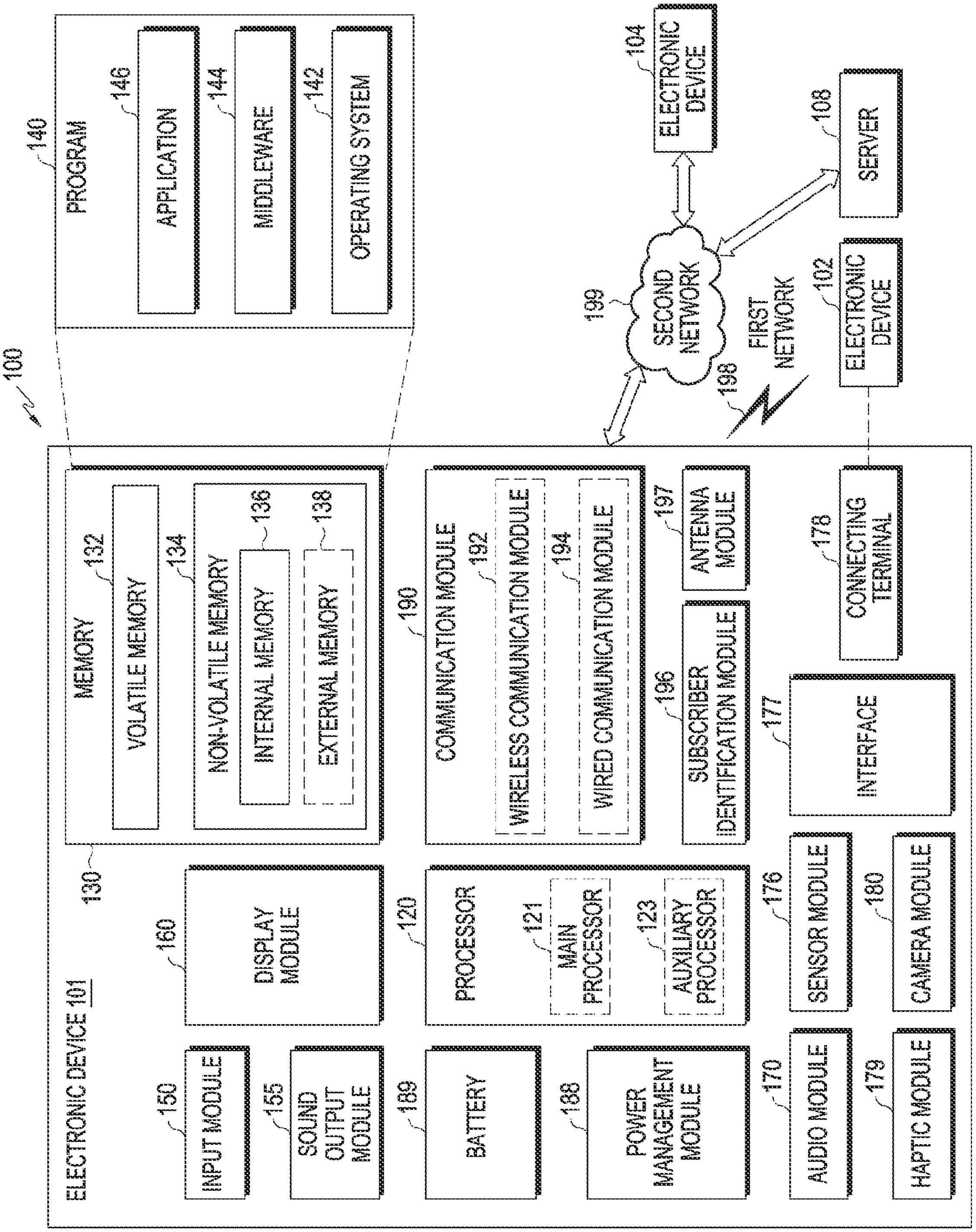
FIG. 1 is a block diagram illustrating an embodiment of an electronic device in a network environment according to the disclosure.

FIG. 1 is a block diagram illustrating an embodiment of an electronic device in a network environment according to the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the or more external electronic devices to perform at least part of the function or the service. The or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following detailed description, a length direction, a width direction, and/or a thickness direction of an electronic device may be referred to. The length direction may be defined as a 'Y-axis direction', the width direction may be defined as an 'X-axis direction', and/or the thickness direction may be defined as a 'Z-axis direction'. Regarding a direction that a component faces, a 'negative sign/positive sign (−/+)' may be referred to together with the Cartesian coordinate system illustrated in the drawings. For example, a front surface of an electronic device or a housing may be defined as a 'surface facing a +Z direction', and a rear surface thereof may be defined as a 'surface facing a −Z direction'. According to an embodiment, a side surface of the electronic device or the housing may include an area facing a +X direction, an area facing a +Y direction, an area facing a −X direction, and/or an area facing a −Y direction. Further, in an embodiment, the "X-axis direction" may mean both the "−X direction" and the "+X direction". This is based on the Cartesian coordinate system depicted in the drawings, for simplicity of description, and it is to be noted that the description of these directions or components does not limit an embodiment of the disclosure. For example, the afore-mentioned direction that the front surface or the rear surface rear faces may vary depending on whether the electronic device is in an unfolded or folded state, and be interpreted differently depending on the gripping habit of a user.

Figure 2:
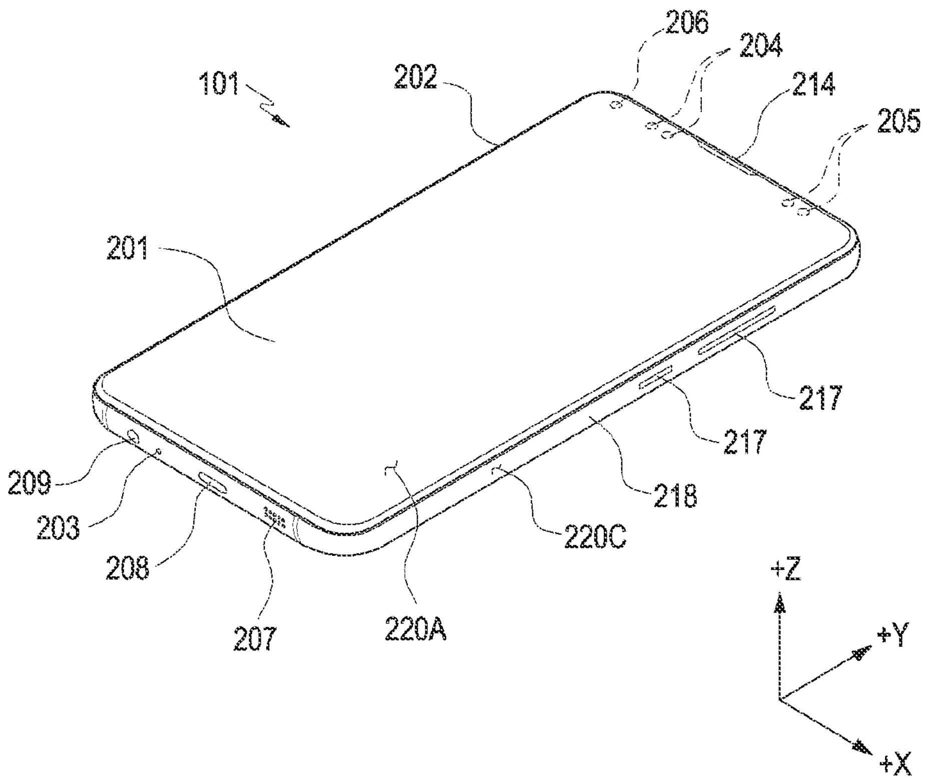
FIG. 2 is a front perspective view illustrating an embodiment of an electronic device according to the disclosure.
Figure 3:
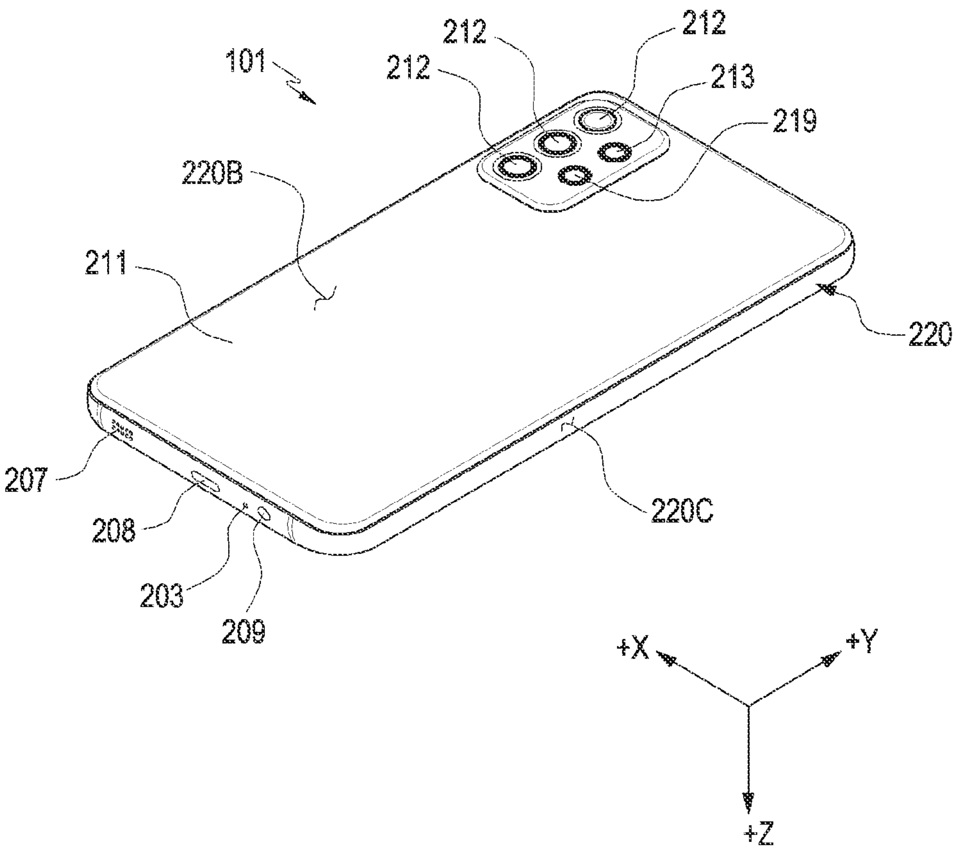
FIG. 3 is a rear perspective view illustrating an embodiment of an electronic device according to the disclosure.

FIG. 2 is a perspective view illustrating a front surface of an embodiment of an electronic device 101 according to the disclosure. FIG. 3 is a perspective view illustrating a rear surface of an embodiment of the electronic device 101 according to the disclosure. The configuration of the electronic device 101 illustrated in FIGS. 2 and 3 may be wholly or partially identical to that of the electronic device 101 illustrated in FIG. 1.

Referring to FIG. 2, the electronic device 101 according to an embodiment may include a housing 220 which includes a first surface (or front surface) 220A, a second surface (or rear surface) 220B, and a side surface 220C surrounding a space between the first surface 220A and the second surface 220B. In an embodiment (not shown), the housing 220 may refer to a structure that forms a portion of the first surface 220A of FIG. 2, the second surface 220B of FIG. 3, and the side surface 220C. According to an embodiment, at least a portion of the first surface 220A may be formed by a front plate 202 (e.g., a glass plate or polymer plate including various coating layers) which is at least partially substantially transparent. The second surface 220B may be formed by a rear plate 211 which is substantially opaque. The rear plate 211 may be formed of, for example, coated or tinted glass, ceramic, a polymer, a metal (e.g., aluminum, stainless steel, or magnesium), or a combination of at least two of these materials. The side surface 220C may be coupled with the front plate 202 and the rear plate 211 and formed by a side structure (or "side bezel structure") 218 including a metal and/or a polymer. In an embodiment, the rear plate 211 and the side structure 218 may be integrally formed of and include the same material (e.g., a metallic material such as, for example, aluminum).

Although not shown, the front plate 202 may include area(s) bent and extending seamlessly from at least a portion of an edge thereof toward the rear plate 211. In an embodiment, the front plate 202 (or the rear plate 211) may include one of (e.g., only one of) the areas bent and extending seamlessly toward the rear plate 211 (or the front plate 202) at one edge of the first surface 210A. According to an embodiment, the front plate 202 or the rear plate 211 may be substantially flat in shape, and in this case, may be absent a bent extended area. When a bent extended area is included, a part of the electronic device 101 including the bent extended area may have a smaller thickness compared to another part of the electronic device 101.

According to an embodiment, the electronic device 101 may include at least one of a display 201, audio modules 203, 207, and 214 (e.g., the audio module 170 of FIG. 1), sensor modules 204 and 219 (e.g., the sensor module 176 of FIG. 1), camera modules 205, 212, and 213 (e.g., the camera module 180 of FIG. 1), key input devices 217 (e.g., the input module 150 of FIG. 1), a light emitting element 206, and connector holes 208 and 209 (e.g., the connecting terminal 178 of FIG. 1). In an embodiment, at least one of the components (e.g., the key input devices 217 or the light emitting element 206) may be omitted from the electronic device 101 or the electronic device 101 may additionally include other components than those described herein.

The display 201 may be visually exposed, for example, through a substantial portion of the front plate 202. In one or more embodiments, at least a portion of the display 201 may be exposed through the front plate 202 forming the first surface 220A or a portion of the side surface 210C. In an embodiment, corners of the display 201 may be formed such that the corners of the display 201 are substantially of the same shape as adjacent peripheral portions of the front plate 202. In an embodiment (not shown), a gap between the periphery of the display 201 and the periphery of the front plate 202 may be substantially equal to a target gap distance to increase the visually exposed area of the display 201.

In an embodiment (not shown), a recess or an opening may be formed in a portion of a view area of the display 201, and at least one of the audio module 214, the sensor module 204, the camera module 205, and the light emitting element 206, which is aligned with the recess or the opening, may be included. In an embodiment (not shown), at least one of the audio module 214, the sensor module 204, the camera module 205, a fingerprint sensor (not shown), and the light emitting element 206 may be included on the rear surface of the view area of the display 201. In an embodiment (not shown), the display 201 may be incorporated with or disposed adjacent to a touch sensing circuit, a pressure sensor that measures the intensity (pressure) of a touch, and/or a digitizer that detects a magnetic field-based stylus pen. In an embodiment, at least some of the sensor modules 204 and 219 and/or at least some of the key input devices 317 may be disposed on the side surface 220C.

The audio modules 203, 207, and 214 may respectively be referred to as a microphone hole 203 and speaker holes 207 and 214. A microphone for obtaining an external sound may be disposed in the microphone hole 203, and in an embodiment, a plurality of microphones may be disposed to detect the direction of a sound. The speaker holes 207 and 214 may include an external speaker hole 207 and a receiver hole 214 for audio communications. In an embodiment, the speaker holes 207 and 214 and the microphone hole 203 may be implemented as a single hole, or a speaker (e.g., a piezo speaker) may be included without the speaker holes 207 and 214.

The sensor modules 204 and 219 may generate an electrical signal or data value corresponding to an internal operating state of the electronic device 101 or an external environmental state. The sensor modules 204 and 219 may include, for example, a first sensor module 204 (e.g., a proximity sensor) and/or a second sensor module (not shown) (e.g., a fingerprint sensor), disposed on the first surface 220A, and/or a third sensor module 219 and/or a fourth sensor module (not shown) (e.g., a fingerprint sensor), disposed on the second surface 220B of the housing 210. The fingerprint sensor may be disposed on the second surface 220B or the side surface 220C as well as on the first surface 220A (e.g., the display 201). The electronic device 101 may further include at least one of, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and an illuminance sensor 204.

The camera modules 205, 212, and 213 may be referred to as a first camera device 205, a second camera device 212, and a flash 213. In one or more embodiments, the first camera device 205 may be disposed on the first surface 220A of the electronic device 101, and the second camera device 212 and/or the flash 213 may be disposed on the second surface 220B of the electronic device 101. Each of the camera modules 205 and 212 may include one or more lenses, an image sensor, and/or an image signal processor. The flash 213 may include, for example, a light emitting diode (LED) or a xenon lamp. In an embodiment, one or more lenses (an IR camera, a wide-angle lens, and a telephoto lens) and image sensors may be arranged on a surface of the electronic device 101. In an embodiment, the flash 213 may radiate IR light, and the IR light radiated from the flash 213 and reflected from a subject may be received through a third sensor module 219. The electronic device 101 or the processor of the electronic device 101 may detect depth information about the subject based on a temporal instance when the IR light is received at the third sensor module.

The key input devices 217 may be arranged on the side surface 220C of the housing 220. In an embodiment, the electronic device 101 may omit some or any of the above key input devices 217, and any key input devices 217 which are not included may be implemented in other forms such as, for example, soft keys on the display 201. In an embodiment, the key input devices 217 may include a sensor module disposed on the second surface 220B of the housing 210.

The light emitting element 206 may be disposed, for example, on the first surface 220A of the housing 220. The light emitting element 206 may provide, for example, state information about the electronic device 101 in the form of light. In an embodiment, the light emitting element 206 may provide, for example, a light source interworking with an operation of the camera module 205. The light emitting element 206 may include, for example, an LED, an IR LED, and a xenon lamp.

The connector holes 208 and 209 may include a first connector hole 208 that may accommodate a connector (e.g., a universal serial bus (USB) connector) for transmitting and receiving power and/or data to and from an external electronic device and a connector (e.g., an earphone jack) 209 for transmitting and receiving an audio signal to and from an external electronic device.

Figure 4:
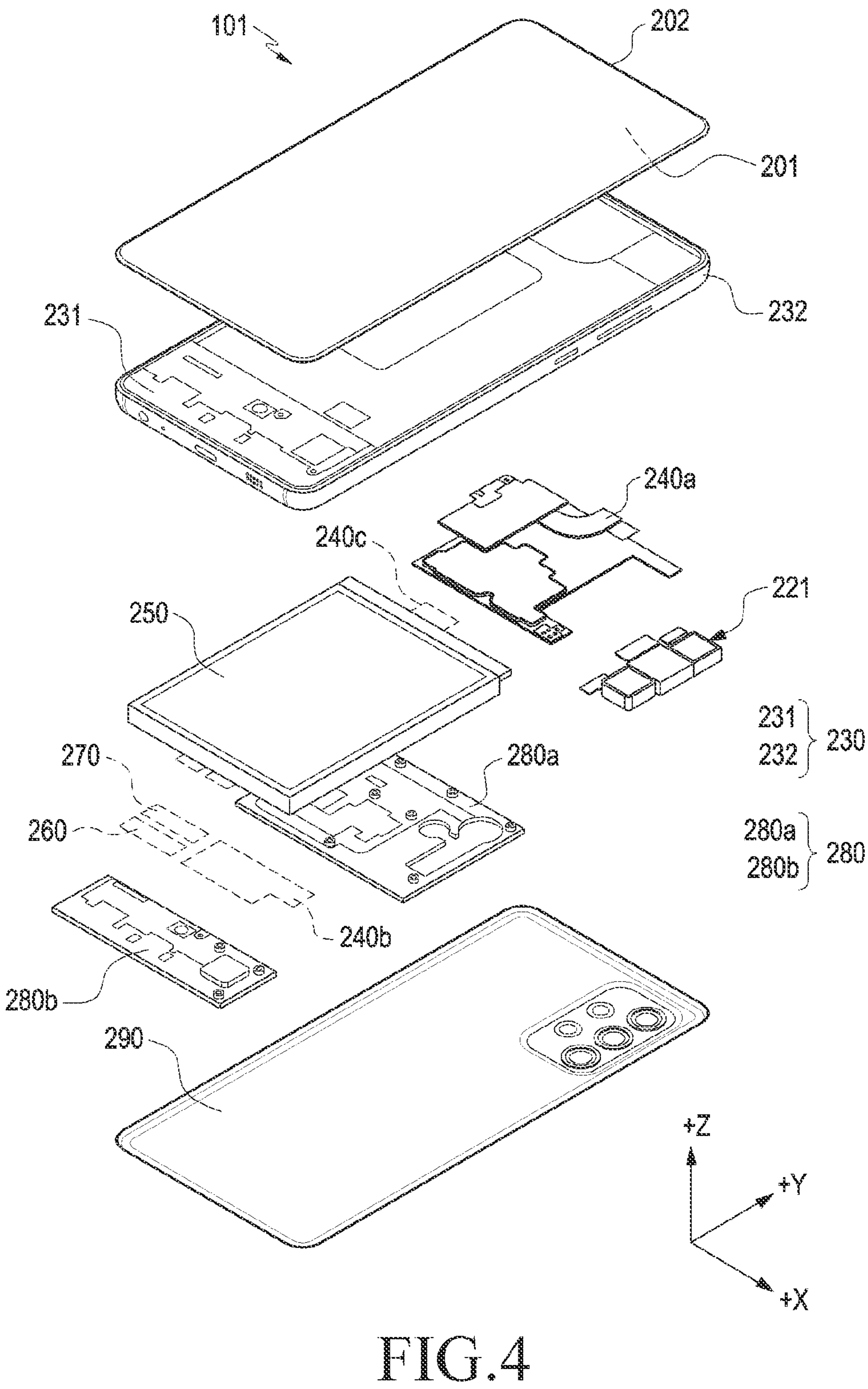
FIG. 4 is a front exploded perspective view illustrating an embodiment of an electronic device according to the disclosure.
Figure 5:
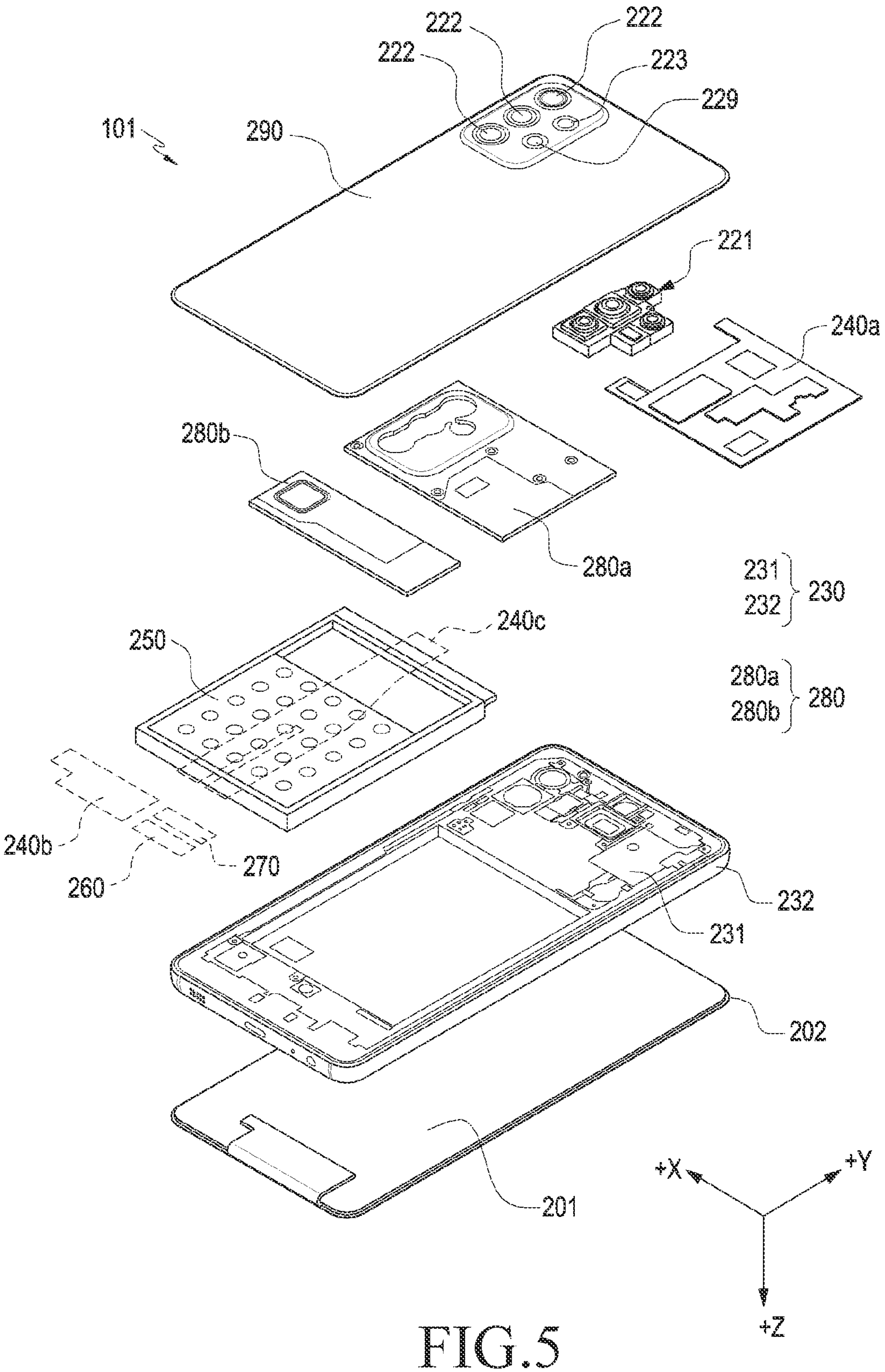
FIG. 5 is a rear exploded perspective view illustrating an embodiment of an electronic device according to the disclosure.

FIG. 4 is an exploded perspective view illustrating the front surface of an embodiment of the electronic device 101 illustrated in FIG. 2 according to the disclosure. FIG. 5 is an exploded perspective view illustrating the rear surface of an embodiment of the electronic device 101 illustrated in FIG. 2 according to the disclosure.

Referring to FIGS. 4 and 5, the electronic device 101 (e.g., the electronic device 101 of FIG. 1 and/or the electronic device 101 of FIG. 2 or 3) may include a support member 231 (e.g., a bracket), a side frame 232, the front plate 202 (e.g., the front plate 202 of FIG. 2), the display 201 (e.g., the display 201 of FIG. 2), at least one printed circuit board (PCB) (or board assembly) 240 (including PCB 240*a* and PCB 240*b*), a speaker assembly 260 (e.g., the audio module 170 of FIG. 1), a motor assembly 270 (e.g., the haptic module 179 of FIG. 1), a rear case 280, a battery 250 (e.g., the battery 189 of FIG. 1), an antenna (not shown) (e.g., the antenna module 197 of FIG. 1), a camera module 221 (e.g., the camera module 180 of FIG. 1), and/or a rear plate 290 (e.g., the rear plate 211 of FIG. 3). When including a plurality of PCBs (e.g., PCB 240*a* and PCB 240*b*), the electronic device 101 may include at least one flexible printed circuit board (FPCB) 240*c* to electrically connect the different PCBs to each other. For example, the PCBs 240*a* and 240*b* may be a first PCB 240*a* disposed above the battery 250 and a second PCB 240*b* disposed below the battery 250, and the FPCB 240*c* may electrically connect the first circuit board 240*a* and the second circuit board 240*b* to each other. The terms "PCB 240" and "circuit board 240" may be used interchangeably herein.

According to an embodiment, at least one (e.g., the support member 231 or the rear case 280) of the components may be omitted from the electronic device 101 or the electronic device 101 may additionally include other components. At least one of the components of the electronic device 101 may be the same as or similar to at least one of the components of the electronic device 101 of FIG. 2 or 3, and redundant descriptions thereof are avoided herein.

In an embodiment, at least a portion of the support member 231 may be provided in the shape of a flat plate. In an embodiment, the support member 231 may be disposed inside the electronic device 101 and connected to the side frame 232 or may be integrally formed with the side frame 232. For example, the support member 231 may be formed of a conductive material and/or a non-conductive material (e.g., polymer). When the support member 231 at least partially includes a conductive material (e.g., a metal), a portion of the side frame 232 or support member 231 may function as an antenna. The support member 231 may include two surfaces facing opposite directions. The display 201 may be disposed on one of the two surfaces of the support member 231, and the PCBs 240*a* and 240*b* may be disposed on the other of the two surfaces. A processor, memory, and/or an interface may be mounted on the PCBs 240*a* and 240*b*. The processor may include at least one of a CPU, an AP, a GPU, an image signal processor, a sensor hub processor, and a communication processor.

According to an embodiment, the support member 231 and the side frame 232 may be combined and be referred to as a front case or a housing 230. According to an embodiment, the housing 230 may generally be understood as a structure for accommodating, protecting, or disposing electrical/electronic components (e.g., the PCBs 240*a* and 240*b*, the battery 250, or the like) therein. In an embodiment, the housing 230 may be understood as including a structure visually or tactilely perceivable to a user on the exterior of the electronic device 101, for example, the side frame 232, the front plate 202, and/or the rear plate 290. In an embodiment, the front or rear surface of the housing 230 may refer to the first surface 220A of FIG. 2 or the second surface 220B of FIG. 3. In an embodiment, the support member 231 may be interposed between the front plate 202 (e.g., the first surface 220A of FIG. 2) and the rear plate 290 (e.g., the second surface 220B of FIG. 3) and function as a structure for disposing electrical/electronic components (e.g., PCBs 240*a* and 240*b*, camera module 221, or the like) thereon. In the following detailed description, although the camera module 221 may be generally configured to receive light incident through the second surface 220B of FIG. 3, the camera module 205 of FIG. 2 may also be disposed inside the electronic device 101 through the configuration of an embodiment described below.

The memory may include, for example, volatile memory or non-volatile memory.

The interface may include, for example, a HDMI, a USB interface, an SD card interface, and/or an audio interface. The interface may, for example, electrically or physically connect the electronic device 101 to an external electronic device and include a USB connector, an SD card/multimedia card (MMC) connector, or an audio connector.

In an embodiment, the rear case 280 may include an upper rear case 280*a* and a lower rear case 280*b*. In an embodiment, the upper rear case 280*a* may be disposed to surround the PCBs 240*a* and 240*b* (e.g., the first circuit board 240*a*), together with a portion of the support member 231. For example, the upper rear case 280*a* may be disposed to face the support member 231 with the first circuit board 240*a* interposed therebetween.

In an embodiment, the lower rear case 280*b* may be disposed to face the support member 231 with the second circuit board 240*b*, the speaker assembly 260, and/or the motor assembly 270 interposed therebetween. According to an embodiment, the second circuit board 240*b*, the speaker assembly 260, and/or the motor assembly 270 may be disposed on a surface (e.g., +Z direction surface) of the lower rear case 280*b*, and without overlapping with each other. According to an embodiment, a conductive plate (e.g., a first conductive plate 261 and/or a second conductive plates 271) may be disposed on a surface (e.g., +Z direction surface) of the speaker assembly 260 and/or the motor assembly 270. According to an embodiment, a circuit device (e.g., a processor, a communication module (e.g., the communication module 190 of FIG. 1) or memory) implemented in the form of an integrated circuit chip or various electric/electronic components may be disposed on the PCBs 240*a* and 240*b*. According to an embodiment, the PCBs 240*a* and 240*b* may be provided with an electromagnetic shielding environment by the rear case 280.

According to an embodiment, the lower rear case 280*b* may be used as a structure for disposing several electrical/electronic components thereon, such as an interface (e.g., a USB connector, an SD card/MMC connector, or an audio connector) as well as the speaker assembly 260 and the motor assembly 270. According to an embodiment, an electrical/electronic component such as an interface (e.g., a USB connector, an SD card/MMC connector, or an audio connector) may be disposed on an additional PCB (not shown). In this case, the lower rear case 280*b* may be disposed to surround the additional PCB (not shown), together with another part of the support member 231. The speaker module or the interface disposed on the additional PCB (not shown) or the lower rear case 280*b* may be disposed in correspondence to the audio hole 207 or the connector holes 208 and 209 of FIG. 2.

The battery 250 is a device supplying power to at least one component of the electronic device 101, and may include, for example, a non-rechargeable primary battery, a rechargeable secondary battery, or a fuel cell. At least a portion of the battery 250 may be disposed on substantially the same plane as, for example, the PCBs 240*a* and 240*b*. The battery 250 may be integrally disposed inside the electronic device 101 or detachable from the electronic device 101.

The antenna (not shown) may include a conductor pattern implemented on a surface of the rear case 280 through, for example, laser direct structuring. In an embodiment, the antenna may include a printed circuit pattern formed on a surface of a thin film, and the antenna in the form of a thin film may be disposed between the rear plate 290 and the battery 250. The antenna may include, for example, a near field communication (NFC) antenna, a wireless charging antenna, and/or a magnetic secure transmission (MST) antenna. The antenna may, for example, support short-range communication with an external device. In some examples, the antenna may support wireless transmission and receipt of power in association with charging the electronic device 101 or the external device. In an embodiment, another antenna structure may be formed by a combination of the support member 231 and/or the side frame 232 or by a portion of the support member 231 and/or the side frame 232.

In an embodiment, the camera module 221 may include at least one camera module, for example, at least one of a plurality of camera modules illustrated in FIGS. 4 and 5. In an embodiment, the electronic device 101 may include at least cover window 222, 223, and 229. The cover windows may be referred to as optical holes. According to an embodiment, the camera module 221 may receive at least a portion of light incident through the cover windows 222, 223, and 229 inside the electronic device 101. In an embodiment, the camera module 221 may be disposed on a portion of the support member 231 at a position adjacent to the PCBs 240*a* and 240*b*. In an embodiment, the camera module 221 may be substantially aligned with any one of the cover windows 222, 223, and 229 and at least partially surrounded by the rear case 280 (e.g., the upper rear case 280*a*).

Figure 6:
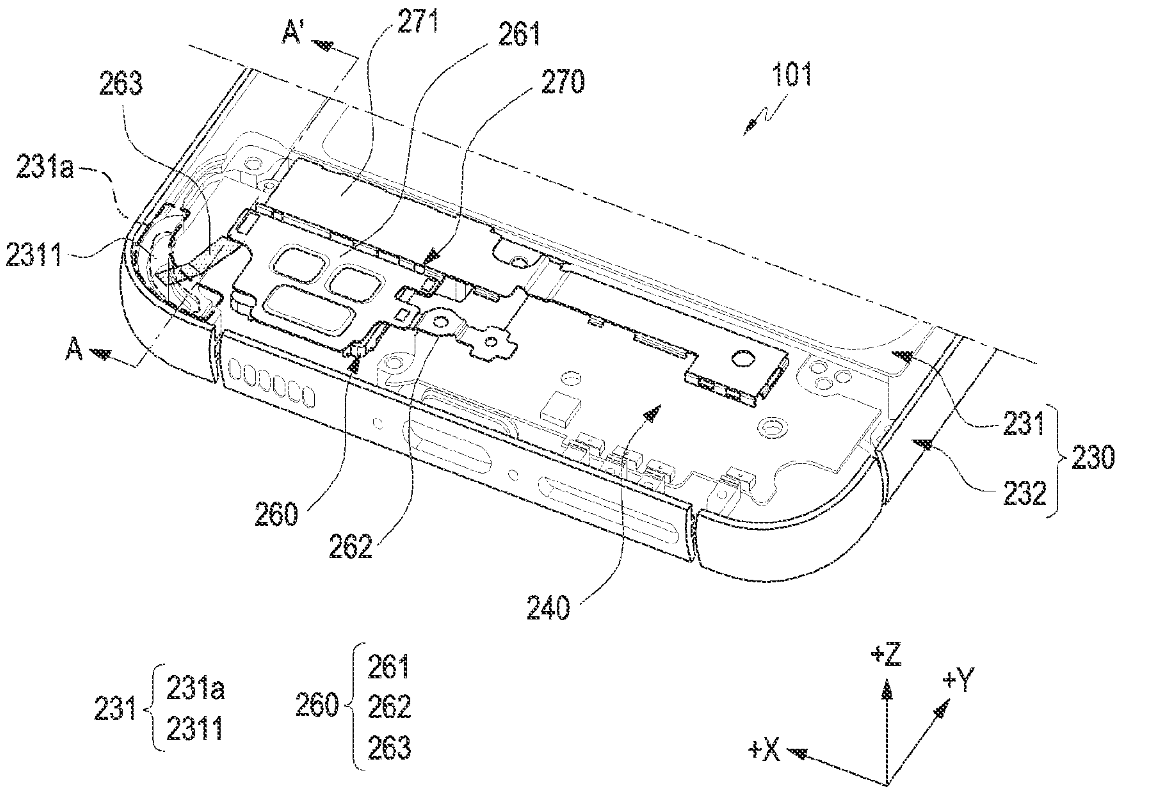
FIG. 6 is a rear perspective view illustrating a portion of an internal configuration of an embodiment of an electronic device according to the disclosure.
Figure 7:
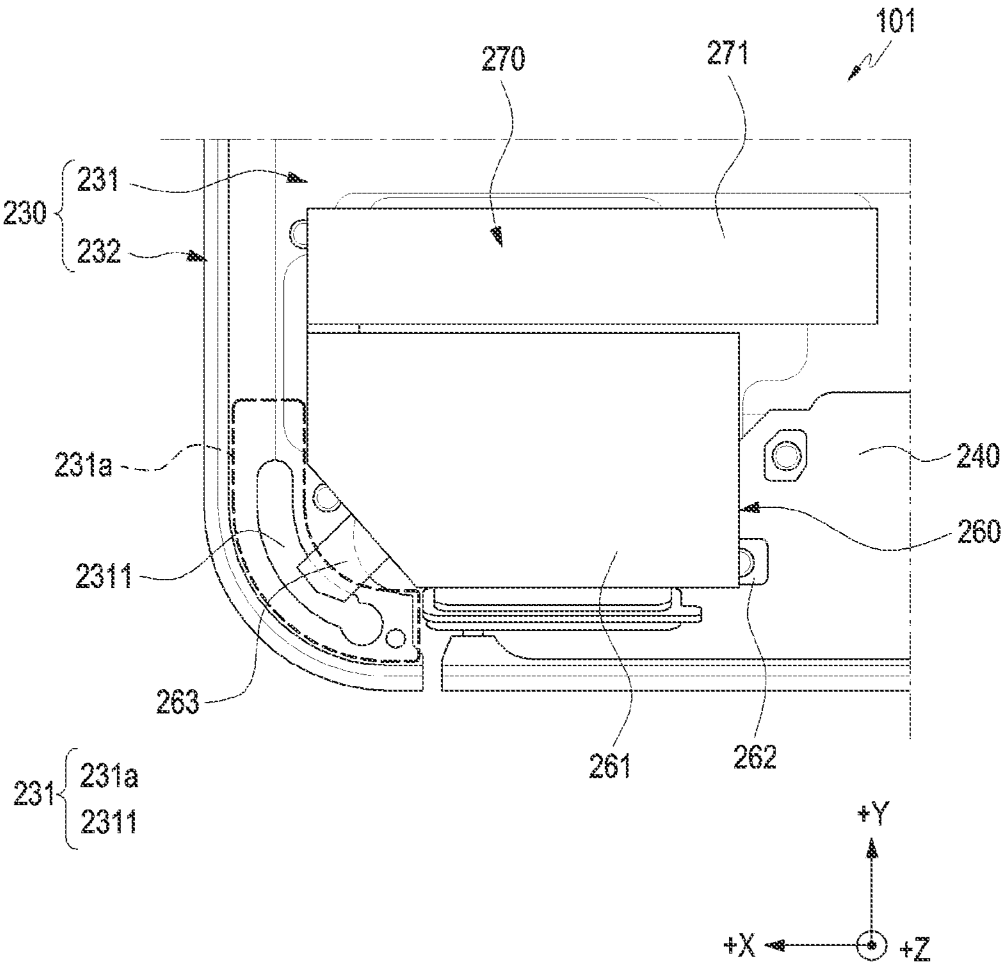
FIG. 7 is a rear view illustrating a portion of an internal configuration of an embodiment of an electronic device according to the disclosure.
Figure 8:
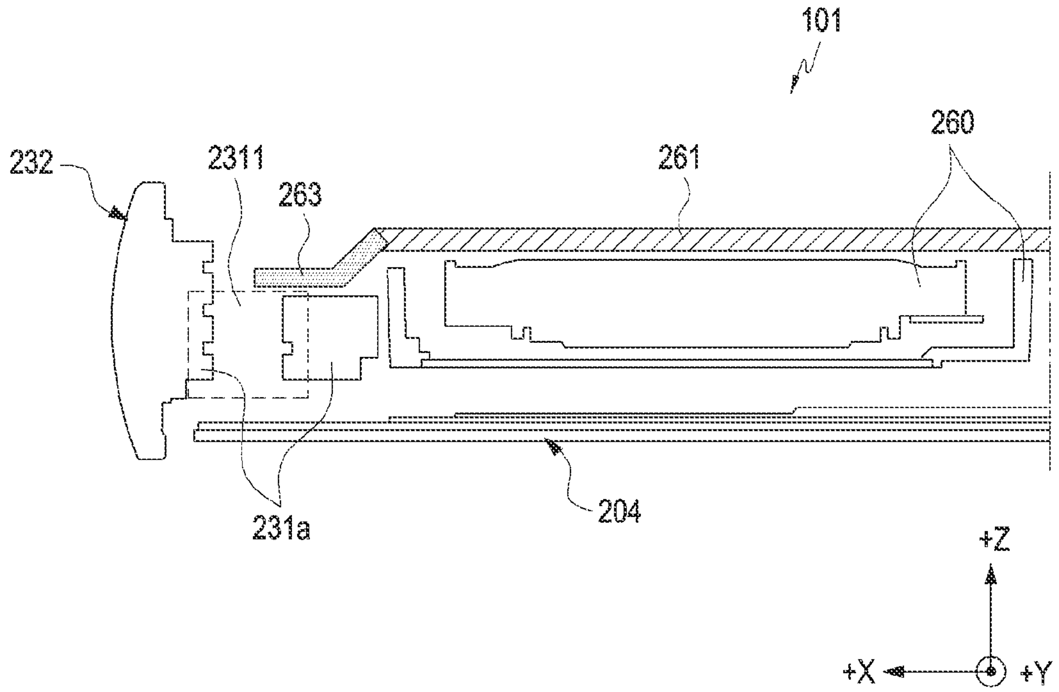
FIG. 8 is a rear view illustrating a portion of an internal configuration of an embodiment of an electronic device according to the disclosure.
Figure 9:
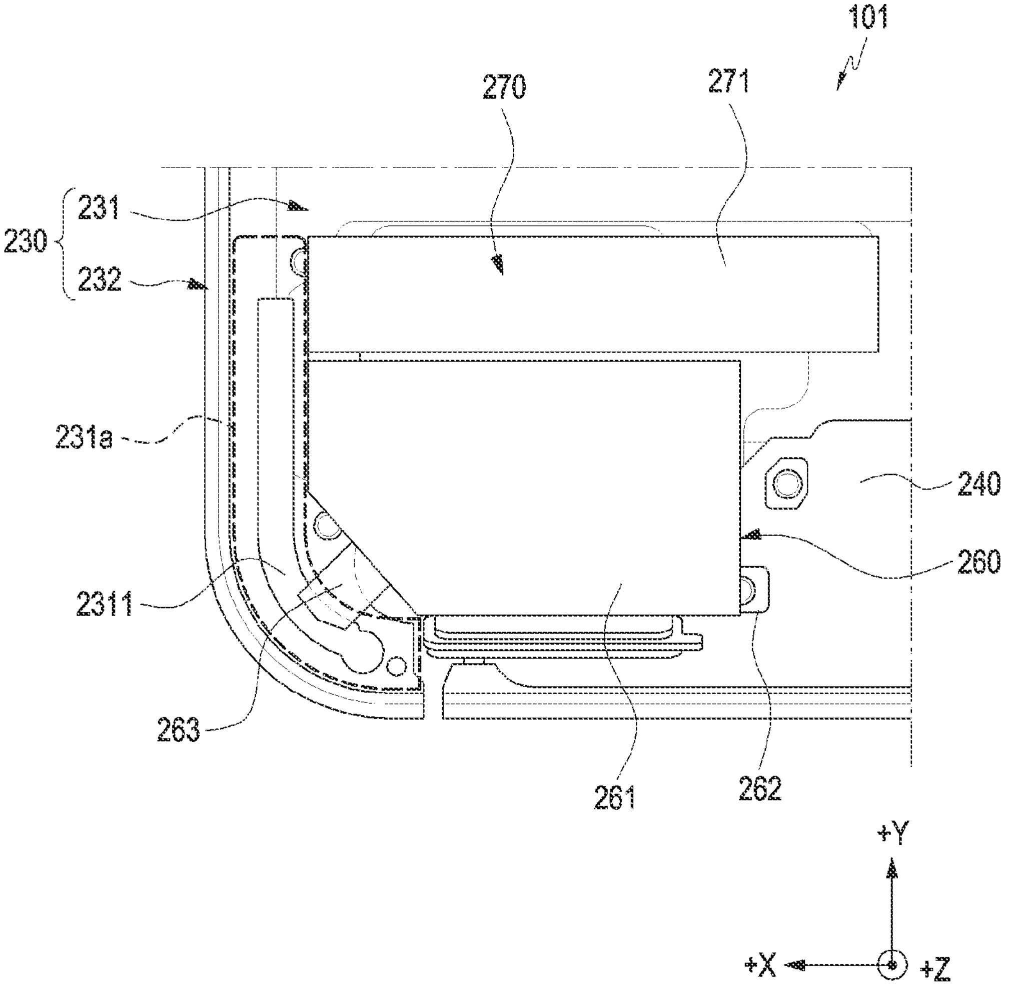
FIG. 9 is a rear view illustrating a portion of an internal configuration of an embodiment of an electronic device according to the disclosure.
Figure 10:
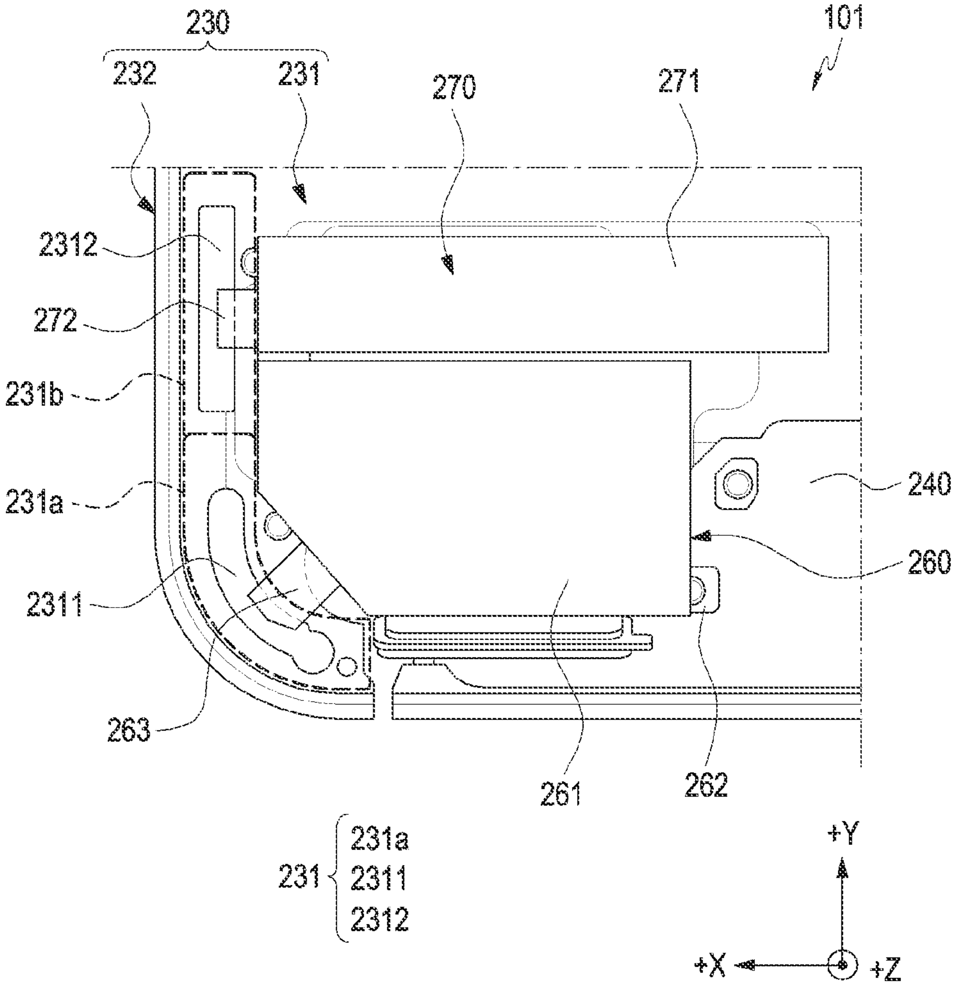
FIG. 10 is a side view along line A-A' of FIG. 6 according to an embodiment of an electronic device according to the disclosure.

FIG. 6 is a rear perspective view illustrating a portion of an internal configuration of an embodiment of an electronic device 101 according to the disclosure. FIG. 7 is a rear view illustrating a portion of an internal configuration of an embodiment of an electronic device 101 according to the disclosure. FIG. 8 is a rear view illustrating a portion of an internal configuration of an embodiment of an electronic device 101 according to the disclosure. FIG. 9 is a rear view illustrating a portion of an internal configuration of an embodiment of an electronic device 101 according to the disclosure. FIG. 10 is a side view along line A-A' of FIG. 6 according to an embodiment of an electronic device 101 according to the disclosure.

The configuration of the electronic device 101 illustrated in FIGS. 6 to 10 may be wholly or partially identical or similar to that of the electronic device 101 illustrated FIG. 1 and/or the electronic device 101 illustrated in FIGS. 2 to 5.

Referring to FIGS. 6 to 10, in an embodiment, the electronic device 101 may include the support member 231 (e.g., the support member 231 of FIGS. 4 and 5), the side frame 232 (e.g., the side frame 232 of FIGS. 4 and 5), a circuit board 240 (e.g., the second circuit board 240*b* of FIGS. 4 and 5), the speaker assembly 260 (e.g., the audio module 170 of FIG. 1), and/or the motor assembly 270 (e.g., the haptic module 179 of FIG. 1). In an embodiment, the electronic device 101 may include the first conductive plate 261 disposed on a surface (e.g., a −Z direction surface) of the speaker assembly 260 and/or the second conductive plate 271 disposed on a surface (e.g., a −Z direction surface) of the motor assembly 270. According to an embodiment, the circuit board 240, the speaker assembly 260, and/or the motor assembly 270 may be disposed adjacent to a second sidewall (e.g., a −Y direction frame) of the frame 232. In the electronic device 101 according to the embodiment illustrated in FIGS. 6 to 10, the support member 231, the circuit board 240, the first conductive plate 261, and/or the second conductive plate 271 may be at least partially connected to each other to form at least one antenna. For example, characteristics of the at least one antenna may be configured based on characteristics (e.g., dimensions) of the support member 231, the circuit board 240, the first conductive plate 261, and/or the second conductive plate 271.

In an embodiment, the support member 231 and the side frame 232 may collectively be referred to as the housing 230 of the electronic device 101. For example, the support member 231 may be connected to an inner surface of the side frame 232 or integrally formed with the side frame 232. In an embodiment, the support member 231 may include, as two surfaces facing opposite directions, one surface (e.g., +Z direction surface) facing the display (e.g., the display 201 of FIGS. 2 to 5) and a second surface (e.g., −Z direction surface) facing the rear case (e.g., the rear plate 290 of FIG. 5). For example, the circuit board 240, the speaker assembly 260, and/or the motor assembly 270 may be disposed on the second surface (e.g., −Z direction surface) of the support member 231.

In an embodiment, the support member 231 (e.g., the support member 231 of FIGS. 4 and 5) may include a conductive area including a conductor (e.g., a metal) in at least a portion thereof. According to an embodiment, the support member 231 may include a first conductive area 231*a* as at least a portion of the conductive area, disposed between mutually facing electronic components (e.g., the motor assembly 270 and/or the speaker assembly 260) and the side frame 232 facing the electronic components.

In an embodiment, the electronic device 101 may be implemented without providing a separate board between the speaker assembly 260 and/or the motor assembly 270 and the side frame 232. According to an embodiment, a portion of the housing 230 (e.g., the support member 231) adjacent to the speaker assembly 260 and/or the side frame 232 may be used as a radiator (e.g., a first antenna) of at least one antenna by providing a feeding structure (e.g., a first feeding part 263) electrically connected to the first conductive area 231*a*, example aspects of which are later described herein. For example, the first conductive area 231*a* may be coupling-fed by at least one conductor (e.g., the first conductive plate 261 and/or the first feeding part 263) connected to the circuit board 240, example aspects of which are later described herein.

According to an embodiment, the first conductive area 231*a* may be in the form of an extension of an outer edge of the support member 231 adjacent to and/or connected to the inner surface of the side frame 232 in at least one axial direction. In an embodiment, the first conductive area 231*a* may be adjacent to a corner where a first sidewall (e.g., +X direction frame) intersects the second sidewall (e.g., −Y direction frame) of the side frame 232. In an embodiment (not shown), the first conductive area 231*a* may include a portion of the side frame 232 connected to a portion of the support member 231.

However, the position and shape of the first conductive area 231*a* of the support member 231 is not limited, and may vary, for example, according to the position of the speaker assembly 260 and/or the motor assembly 270 with respect to the side frame 232 and/or the circuit board 240, and a target frequency band. In an embodiment (see FIGS. 5 to 8), the first conductive area 231*a* may refer to a portion of the conductive area of the support member 231 disposed between the speaker assembly 260 and the side frame 232 facing the speaker assembly 260. In an embodiment (see FIG. 9), the first conductive area 231*a* may refer to a portion of the conductive area of the support member 231 disposed between the speaker assembly 260 and motor assembly 270 and the side frame 232 facing them. In an embodiment (see FIG. 10), the first conductive area 231*a* may include a (1-2)$^{th}$ conductive area 231*b* disposed at least partially between the motor assembly 270 and the side frame 232 facing the motor assembly 270.

According to an embodiment, the circuit board 240 may be an auxiliary circuit board (e.g., the second circuit board 240*b* of FIGS. 4 and 5) provided separately from a main circuit board (e.g., the first circuit board 240*a* of FIGS. 4 and 5). For example, the circuit board 240 may be electrically connected to the main circuit board (e.g., the first circuit board 240*a* of FIGS. 4 and 5) disposed on a surface (e.g., the second surface) of the support member 231 through an electric component (e.g., the FPCB 240*c* of FIGS. 4 and 5). For example, the circuit board 240 may at least partially overlap with the lower rear case (e.g., the lower rear case 260*b* of FIGS. 4 and 5) in the thickness direction (e.g., Z-axis direction) of the electronic device 101. For example, the circuit board 240 may be provided with an electromagnetic shielding environment by the lower rear case (e.g., the lower rear case 260*b* of FIGS. 4 and 5). In an embodiment, the speaker assembly 260 and the motor assembly 270 may be disposed on the same side (e.g., +X direction side) of the circuit board 240. For example, the motor assembly 270 may be disposed above the speaker assembly 260 (e.g., in the +Y direction).

In an embodiment, the first conductive plate 261 may be disposed to surround at least a portion of the outer surface or one surface (e.g., −Z direction surface) of the speaker assembly 260. For example, the first conductive plate 261 may include a conductive material such as, for example, a metal (e.g., stainless steel). For example, the first conductive plate 261 may be integrally formed with the speaker assembly 260 or coupled (e.g., bolted) with or welded to the speaker assembly 260 using, for example, a fastening member. According to an embodiment, the speaker assembly 260 may be disposed spaced apart from parts of the side frame 232, for example, the first sidewall (e.g., +X direction frame) and the second sidewall (e.g., −Y direction frame) by specific distances. For example, at least a portion of the speaker assembly 260 may be disposed between the first conductive area 231*a* and the circuit board 240. In an embodiment, the first conductive plate 261 may be electrically connected to each of the circuit board 240 and the first conductive area 231*a*. According to an embodiment, the first conductive plate 261 may be electrically connected to the second conductive plate 271.

According to an embodiment, the first conductive plate 261 may be electrically connected to each of the first conductive area 231*a* of the support member 231, which is a radiator of the first antenna, and a first signal terminal 262 electrically connected to a first feeding point (not shown) of the circuit board 240, example aspects of which are later described herein. According to an embodiment, the first conductive plate 261 may transmit (e.g., be formed to transmit) a wireless communication signal transmitted and/or received through the first signal terminal 262 and at least a partial area of the first conductive area 231*a*. It is to be understood that the term "may be formed to" as recited herein includes positive recitations of features described with reference to the term.

In an embodiment, the second conductive plate 271 may be disposed to surround at least a portion of the outer surface or one surface (e.g., −Z direction surface) of the motor assembly 270. For example, the second conductive plate 271 may include a conductive material such as, for example, a metal (e.g., stainless steel). For example, the second conductive plate 271 may be integrally formed with the motor assembly 270 or coupled (e.g., bolted) with or welded to the motor assembly 270 using, for example, a fastening member. For example, the second conductive plate 271 may be disposed spaced apart from the first conductive plate 261 (e.g., the first conductive plate 261 of FIGS. 6 to 10) disposed on the speaker assembly 260 and, according to an embodiment, may or may not be physically connected to the first conducive plate 261.

In an embodiment, the second conductive plate 271 may be in the form of an extension from a part disposed on a surface (e.g., −Z direction surface) of the motor assembly 270 onto the circuit board 240. However, the shape and arrangement of the second conductive plate 271 is not limited to the illustration, and in an embodiment (not shown), the second conductive plate 271 may not overlap with the circuit board 240 in the thickness direction (e.g., Z-axis direction) of the electronic device 101. According to an embodiment, the second conductive plate 271 may be omitted. According to an embodiment, the second conductive plate 271 may be electrically connected to the first conductive plate 261 in a non-contact manner (e.g., electromagnetic coupling) and/or in a contact manner by partial connection or by using a conductive member (e.g., a C-clip). According to an embodiment, the second conductive plate 271 may be formed to be electrically connected to each of the (1-2)$^{th}$ conductive area 231*b* (e.g., an area around a second slot 2312) of the support member 231, which is a radiator of the first antenna, and the first conductive plate 261, and transmit a wireless communication signal transmitted and/or received through the (1-2)$^{th}$ conductive area 231*b*, example aspects of which are later described herein.

In an embodiment, the first conductive area 231*a* may include a first slot 2311 in a partial area thereof. In the disclosure, at least a partial area of the first conductive area 231*a* around the first slot 2311 may be referred to as a "first radiator" of the first antenna. According to an embodiment, the first slot 2311 may be electromagnetically coupled to the first feeding part 263 protruding from the first conductive plate 261. The at least partial area (or the "first radiator") including a peripheral portion of the first slot 2311 may be fed by the first feeding part 263, and form the first antenna (e.g., a slot antenna). For example, characteristics of the first antenna (e.g., slot antenna) may be configured based on characteristics (e.g., dimensions) of the at least partial area. According to an embodiment, aside from the first feeding part 263, the first antenna, which is a slot antenna, may not be grounded to a ground of the conductive area of the housing 230 and/or the circuit board in the electronic device 101. In an example, the ground of the conductive area of the housing 230 and/or the circuit board in the electronic device 101 may be a separate contact member (e.g. a C-clip).

Referring to FIGS. 7 and 8, according to an embodiment, the first slot 2311 may extend in parallel to at least a portion of an edge of the first conductive area 231*a*. For example, the first slot 2311 may be spaced apart from the side frame 232, and may not overlap with the speaker assembly 260 (e.g., the first conductive plate 261) and/or the motor assembly 270 (e.g., the second conductive plate 271) in the thickness direction (e.g., Z-axis direction) of the electronic device 101. For example, at least a portion of the first slot 2311 may be parallel to a corner where the first sidewall (e.g., +X direction frame) and the second sidewall (e.g., −Y direction frame) of the side frame 232 intersect. For example, the first slot 2311 may at least partially overlap with the first feeding part 263 in the thickness direction (e.g., Z-axis direction) of the electronic device 101. In an example, the first slot 2311 may be in the shape of 'L' or 'J'. In some examples, aspects of the present disclosure support setting and changing the width and/or length of the first slot 2311 according to a target frequency band of the antenna. According to the disclosure, the formation of the conductive area of the support member 231 disposed inside the electronic device 101, adjacent to the outer surface of the electronic device 101, as a radiator of an antenna, removes or mitigates the degradation of communication quality which might be otherwise result due to the hand grip of a user at the outer surface of the electronic device 101, compared to a case in which the side frame 232 forming the outer surface of the electronic device 101 is used as a radiator.

Referring to FIG. 7, in an embodiment, the first slot 2311 may be formed such that an end of the first slot 2311 is disposed between the first sidewall (e.g., +X direction frame) of the side frame 232 of the first conductive area 231*a* and the speaker assembly 260. However, aspects of the present disclosure support setting and changing the definition of the first conductive area 231*a* and the width and/or length of the first slot 2311 according to a target frequency band of the antenna.

Referring to FIGS. 5 to 10, in an embodiment, the first conductive plate 261 may include the first signal terminal 262 and/or the first feeding part 263, which is disposed in an edge area of the first conductive plate 261. According to an embodiment, the circuit board 240 may include the first feeding point (not shown) disposed at a position corresponding to the first signal terminal 262.

According to an embodiment, at least one first signal terminal 262 may be electrically connected to the first feeding point (not shown) disposed on the circuit board 240. For example, the first signal terminal 262 may be a conductive member connected to each of the first conductive plate 261 and the first feeding point (not shown). For example, the first feeding point (not shown) may be disposed at the position corresponding to the first signal terminal 262 on the circuit board 240. For example, the first signal terminal 262 as a separate conductive member may be coupled with the first conductive plate 261 in a method such as, for example, welding, and according to an embodiment (not shown), may be integrally formed with the first conductive plate 261. In an example, an area in which the first signal terminal 262 is coupled with the first conductive plate 261 may protrude toward the circuit board 240. In an embodiment (not shown), the first signal terminal 262 may be integrally formed with the first conductive plate 261. According to an embodiment, the first signal terminal 262 and/or the first feeding part 263 may be provided in plurality.

According to an embodiment, the first feeding part 263 may be electromagnetically coupled to the at least partial area (or the "first radiator") including the peripheral portion of the first slot 2311 of the first conductive area 231*a*. For example, the first feeding part 263 may be a strip-shaped conductive member. According to an embodiment, the first feeding part 263 may protrude from the first conductive plate 261 toward the first conductive area 231*a* (e.g., toward the first slot 2311). In an example, the first feeding part 263 may be disposed spaced apart from the first conductive area 231*a* in at least one axial direction (e.g., the thickness direction or Z-axis direction of the electronic device 101). For example, the first feeding part 263 may at least partially overlap with the first conductive area 231*a* and/or the first slot 2311 in the thickness direction (e.g., Z-axis direction) of the electronic device 101.

Referring to FIG. 9, there may be a step between the first conductive plate 261 and the first conductive area 231*a* of the support member 231 in the thickness direction (e.g., Z-axis direction) of the electronic device 101. For example, the step may be due to a difference in location of the first conductive plate 261 and the first conductive area 231*a* in the thickness direction (e.g., Z-axis direction) of the electronic device 101. In this case, there may be a step between a portion of the first feeding part 263 connected to the first conductive plate 261 and a portion of the first feeding part 263 adjacent to the first conductive area 231*a* or the first slot 2311 in the thickness direction (e.g., Z-axis direction) of the electronic device 101. For example, the step may be result due to a difference in location of the different portions of the first feeding part 263 in the thickness direction (e.g., Z-axis direction) of the electronic device 101.

In an example, in an embodiment (not shown), the first signal terminal 262 and/or the first feeding part 263 may be provided in plurality on the first conductive plate 261, respectively. In some examples, aspects of the present disclosure support setting and changing the extension direction, shape, and/or length of the first signal terminal 262 according to a target frequency band of the antenna.

According to an embodiment, when a feeding signal is applied to the first feeding part 263 through the first conductive plate 261 connected to the circuit board 240, at least a portion of the first conductive area 231*a* may be coupling-fed. When the first conductive area 231*a* is coupling-fed, a current flow may be generated, for example, around the first slot 2311. For example, current may flow in a closed path along the periphery of the first slot 2311 (e.g., indicated by C1 in FIG. 12). According to an embodiment, the current flow in the first conductive area 231*a* as a radiator may be located inside the electronic device 101. Accordingly, for example, communication failure and the degradation of communication quality caused by the introduction of external static electricity into the electronic device 101 may be suppressed.

Referring to FIG. 9, in an embodiment, the first conductive area 231*a* may refer to a portion of the conductive area of the support member 231 disposed between the speaker assembly 260 and motor assembly 270 and the side frame 232 facing them. According to an embodiment, the first slot 2311 may be formed to extend such that an end of the first slot 2311 is located between the first sidewall (e.g., +X direction frame) of the side frame 232 in the first conductive area 231*a* and the motor assembly 270. For example, the length of the first slot 2311 may be greater in the embodiment of FIG. 9 than in the embodiment of FIG. 7, and the first antenna may have a lower target frequency band in the embodiment of FIG. 9 than in the embodiment of FIG. 7.

Referring to FIG. 10, in an embodiment, the first conductive area 231*a* may include the $(1\text{-}2)^{th}$ conductive area 231*b* disposed at least partially between the motor assembly 270 and the side frame 232 facing the motor assembly 270. Referring to FIG. 10, in an embodiment, the electronic device 101 may include a second antenna (slot antenna) using at least a portion of the $(1\text{-}2)^{th}$ conductive area 231*b* as a radiator (e.g., a second radiator).

In an embodiment, the $(1\text{-}2)^{th}$ conductive area 231*b* may further include the second slot 2312 in another area spaced apart from an area in which the first slot 2311 is formed. According to example aspects of the present disclosure, at least a partial area around the second slot 2312 in the $(1\text{-}2)^{th}$ conductive area 231*a* may be referred to as the "second radiator" of the second antenna. According to an embodiment, the second conductive plate 271 may further include a second feeding part 272 protruding toward the second slot 2312 in a partial area thereof. The second feeding part 272 may be electromagnetically coupled to the at least partial area (or "second radiator") around the second slot 2312 in the $(1\text{-}2)^{th}$ conductive area 231*a*. For example, the second antenna may have a frequency band at least partially different from that of the first antenna (slot antenna) using the first slot 2311. In the descriptions of the second slot 2312 and the second feeding part 272 below, descriptions redundant to the above description of the first slot 2311 and the first feeding part 263 are omitted for brevity.

Referring to FIG. 10, in an embodiment, the second slot 2312 may be disposed above the first slot 2311 (e.g., in the −Y direction). For example, at least a portion of the second slot 2312 may be located between the first sidewall (e.g., the +X direction frame) of the side frame 232 and the motor assembly 270. For example, the second feeding part 272 may be spaced apart from the $(1\text{-}2)^{th}$ conductive area 231*b* or the second slot 2312 at least in the thickness direction (e.g., Z-axis direction) of the electronic device 101. For example, the second slot 2312 may at least partially overlap with the second feeding part 272 in the thickness direction (e.g., Z-axis direction) of the electronic device 101. For example, in the second antenna (slot antenna), the second feeding part 272 may coupling-feed the at least partial area (or "second radiator") around the second slot 2312 in the (1-2)$^{th}$ conductive area 231*b* through an electrical path from the first feeding part 263 disposed on the circuit board 240 through the first signal terminal 262, the first conductive plate 261, the second conductive plate 271 electrically connected to the first conductive plate 261 to the second feeding part 272. When a wireless communication signal is transmitted and/or received by the second radiator, current may flow along a closed path (e.g., indicated by C1 in FIG. 12) formed around the second slot 2312 in the (1-2)$^{th}$ conductive area 231*b*.

Figure 11:
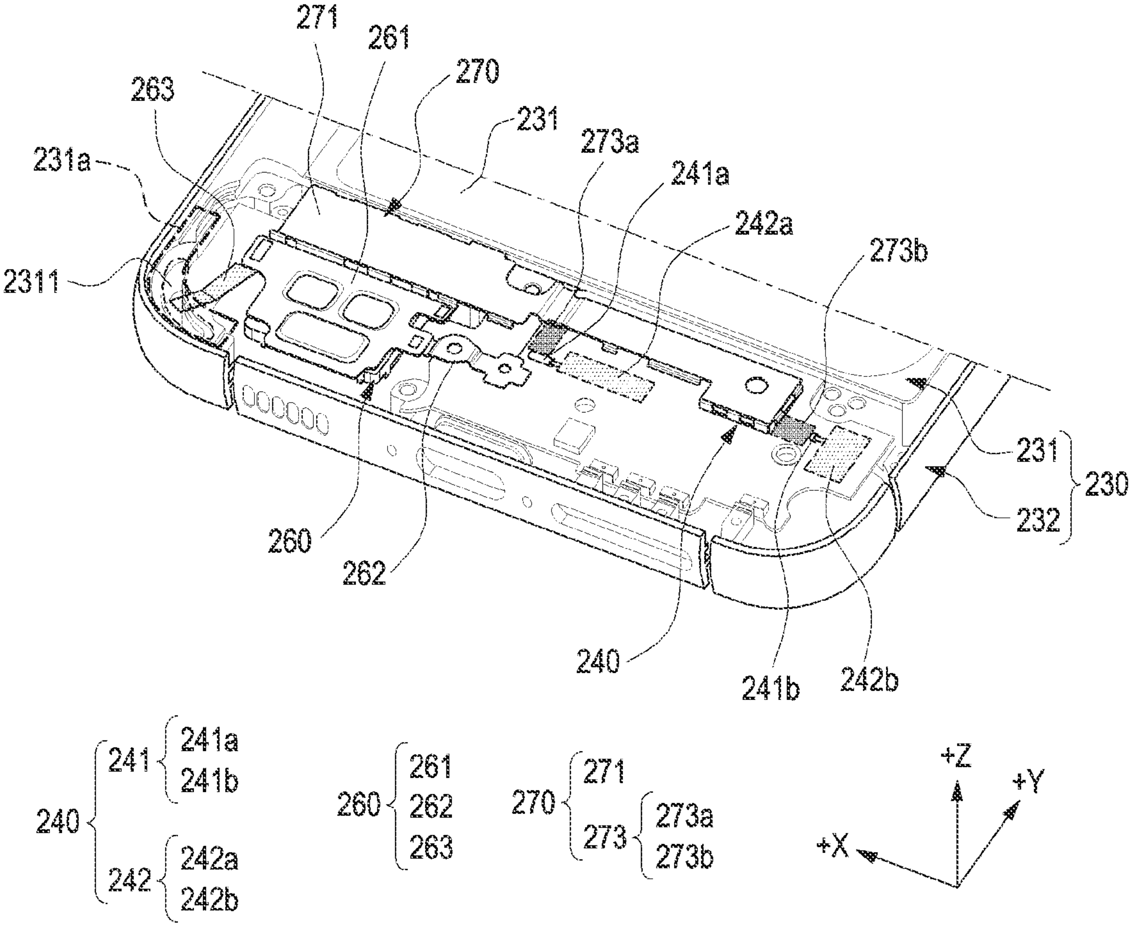
FIG. 11 is a rear perspective view illustrating a portion of an internal configuration of an embodiment of an electronic device according to the disclosure.
Figure 12:
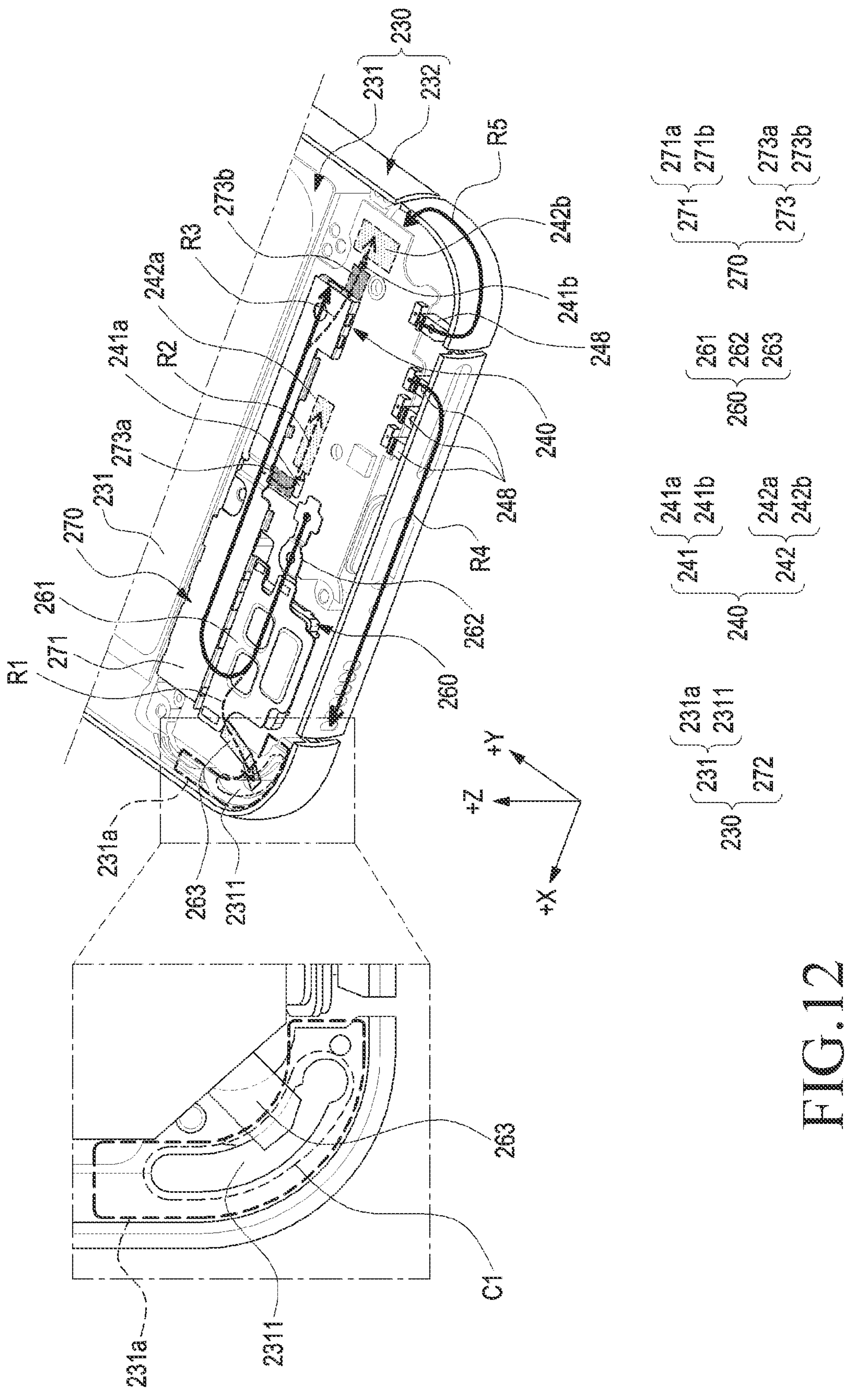
FIG. 12 is a rear perspective view illustrating an electrical path of an antenna in an embodiment of an electronic device according to the disclosure.
Figure 13:
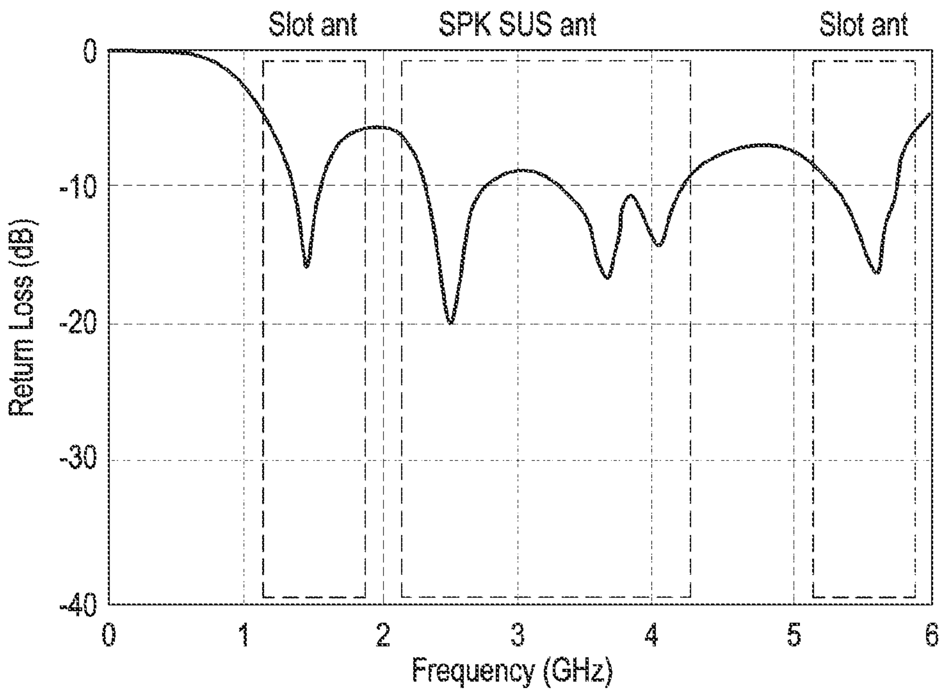
FIG. 13 illustrates a frequency band of an antenna in an embodiment of an electronic device according to the disclosure.

FIG. 11 is a rear perspective view illustrating a portion of an internal configuration of an embodiment of an electronic device 101 according to the disclosure. FIG. 12 is a rear perspective view illustrating an electrical path of an antenna in an embodiment of an electronic device 101 according to the disclosure. FIG. 13 illustrates a frequency band of an antenna in an embodiment of an electronic device 101 according to the disclosure.

The configuration of the electronic device 101 illustrated in FIGS. 11 and 12 may be wholly or partially identical or similar to that of the electronic device 101 of FIG. 1 and/or the electronic device 101 of FIGS. 2 to 5. Hereinbelow, the description of the configuration of the electronic device 101 or the antenna described with reference to FIGS. 6 to 10 may be wholly or partially applied, and a redundant description may be avoided.

The support member 231, the circuit board 240, the speaker assembly 260, and/or the motor assembly 270 of the electronic device 101 according to the embodiment illustrated in FIGS. 11 and 12 may include components that implement a plurality of antennas. Each of the plurality of antennas in the electronic device 101 according to the embodiment of FIGS. 11 and 12 may include or may omit at least some of the components of the first antenna in the embodiment of FIGS. 6 to 10, and may include a radiator using the second conductive plate 271 of the motor assembly 270, the conductive pattern on the circuit board 240, and/or the second slot 2312 formed in the first conductive area 231*a*.

Referring to FIGS. 11 and 12, in an embodiment, the motor assembly 270 may include the second conductive plate 271 (e.g., the second conductive plate 271 of FIGS. 6 to 9) disposed to surround at least a portion of the outer surface (e.g., −Z direction surface) of the motor assembly 270. In an embodiment, the second conductive plate 271 may include a portion disposed on a surface (e.g., −Z direction surface) of the motor assembly 270 to a portion extending onto the circuit board 240. For example, the second conductive plate 271 of the motor assembly 270 may be integrally formed with the first conductive plate 261 of the speaker assembly 260. For example, the first conductive plate 261 and the second conductive plate 271 may be disposed as individual members adjacent to each other along the length direction (e.g., Y-axis direction) of the electronic device 101, and physically connected to each other through soldering or a separate conductive member. In an embodiment (see FIGS. 11 and 12), the second conductive plate 271 may be physically separated from the first conductive plate 261, and the first conductive plate 261 and the second conductive plate 271 may be spaced apart at a distance supportive of electromagnetic coupling.

In an embodiment, the second conductive plate 271 may include at least one third feeding part 273 disposed on the second conductive plate 271 which is a radiator.

According to an embodiment, the circuit board 240 may include a connection member 241 disposed at a position corresponding to the at least one third feeding part 273 and/or a radiation conductor 242 electrically connected to the connection member 241.

According to an embodiment, the third feeding part 273 of the second conductive plate 271 may be, as a conductive member, electrically connected to each of the second conductive plate 271 and the connection member 241 of the circuit board 240. For example, the third feeding part 273 may be provided in plurality (e.g., two) and include a (3-1)$^{th}$ feeding part 273*a* and a (3-2)$^{th}$ feeding part 273*b* disposed spaced apart from each other at edges of the second conductive plate 271.

According to an embodiment, the connection member 241 (e.g., a C-clip) of the circuit board 240 may be provided in plurality (e.g., two), and include a first connection member 241*a* and a second connection member 241*b* disposed at positions corresponding to the (3-1)$^{th}$ feeding part 273*a* and the (3-2)$^{th}$ feeding part 273*b*, respectively. However, the number of third feeding parts 273 of the second conductive plate 271 and/or the number of connection members 241 of the circuit board 240 corresponding to the third feeding parts 273 are not limited to the example described herein, and for example, the number of connection members 241 may be 1 or 3 or larger.

According to an embodiment, the connection member 241 may be a conductive member such as, for example, a C-clip and fixed to one surface (e.g., −Z direction surface) of the circuit board 240 by soldering.

According to an embodiment, the radiation conductor 242 may be a conductive pattern or antenna chip disposed on a surface (e.g., −Z direction surface) of the circuit board 240. For example, the radiation conductor 242 may be provided in plurality (e.g., two), and include a first radiation conductor 242*a* and a second radiation conductor 242*b* connected to the first connection member 241*a* and the second connection member 241*b*, respectively. For example, the conductive pattern of the radiation conductor 242 may be formed on a surface (e.g., −Z direction surface) of the circuit board 240 by printing, plating, deposition, and/or laser direct structuring. For example, aspects of the present disclosure support setting the length, width, and/or shape of the radiation conductor according to a target frequency band of the antenna. In some aspects, the number of radiation conductors 242 of the circuit board 240 is not limited to the example described herein, and for example, may be 1 or 3 or larger.

Referring to FIGS. 11 and 12, in an embodiment, the electronic device 101 may include a plurality of antennas using the first conductive area 231*a* of the support member 231 and/or the at least one radiation conductor 242 formed on the circuit board 240. According to an embodiment, the first antenna may coupling-feed at least a portion of the first conductive area 231*a* through an electrical path (indicated by R1 in FIG. 12) from the first signal terminal 262 connected to the first feeding point (not shown) disposed on the circuit board 240 through the first conductive plate 261 to the first feeding part 263. For example, when a wireless communication signal is transmitted to and/or received at the at least partial area (or "first radiator") including the peripheral portion of the first slot 2311 in the first conductive area 231*a*, current may flow along the closed path (e.g., indicated by C1 in FIG. 12) formed around the first slot 2311.

According to an embodiment, a third antenna may feed the first radiation conductor 242*a* through an electrical path (indicated by R2 in FIG. 12) from the first signal terminal 262 connected to the first feeding point (not shown) disposed on the circuit board 240 through the first conductive plate 261, the second conductive plate 271, and the first connection member 241*a*, to the first radiation conductor 242*a*. According to an embodiment, a fourth antenna may feed the second radiation conductor 242*b* through an electrical path (indicated by R3 in FIG. 12) from the first signal terminal 262 connected to the first feeding point (not shown) disposed on the circuit board 240 through the first conductive plate 261, the second conductive plate 271, and the second connection member 241*b*, to the second radiation conductor 242*b*.

Referring to FIG. 12, in an embodiment, the electronic device 101 may include a plurality of (e.g., two) metal antennas in which at least a portion of the second sidewall (e.g., −Y direction frame) and/or a third sidewall (e.g., −X direction frame) of the side frame 232 functions as a radiator of an antenna. For example, one slot may be included, which penetrates a portion of the second sidewall (e.g., −Y direction frame) and/or a portion of the third sidewall (e.g., −X direction frame) of the side frame 232 in the thickness direction (e.g., Z-axis direction) of the electronic device 101. According to an embodiment, the circuit board 240 may include a plurality of second signal terminals 248 facing and electrically connected to the second sidewall (e.g., −Y direction frame) and/or the third sidewall (e.g., −X direction frame) of the side frame 232.

According to an embodiment, at least some of the second signal terminals may contact an area of the inner surface of the first sidewall (e.g., +X direction frame) to feed a conductive area of the second sidewall (e.g., −Y direction frame) of the side frame 232. For example, at least one of the second signal terminals may contact an area of the inner surface of the third sidewall (e.g., −X direction frame) to feed a conductive area of the third sidewall (e.g., −X direction frame) of the side frame 232. For example, the plurality of metal antennas may feed radiators corresponding to parts of the second sidewall (e.g., −Y direction frame) and the third sidewall (e.g., −X direction frame) of the side frame 232 through electrical paths indicated by R4 and R5 in FIG. 12.

In an embodiment, the first antenna, the third antenna, the fourth antenna, and the plurality of metal antennas described with reference to FIGS. 11 and 12 and the second antenna described with reference to FIG. 10 may have different frequency bands or at least partially overlapping frequency bands.

FIG. 13 illustrates an example of frequency bands of antennas in an electronic device 101 according to the disclosure. Referring to FIG. 13, according to an embodiment of the electronic device 101, the first antenna (see FIGS. 5 to 9 and/or FIGS. 11 and 12), which is a slot antenna using the support member 231 around the speaker assembly 260 as a radiator, and the second antenna (see FIG. 10) are provided. In an embodiment of the electronic device 101, the first antenna and the second antenna (e.g., Slot ant in FIG. 13), which are slot antennas, may transmit and/or receive a wireless communication signal in a frequency band (e.g., about 1 GHz to about 2 GHz and/or about 5 GHz to about 6 GHz) as well as in a frequency band (e.g., about 2.1 GHz to about 4.2 GHz) of an antenna (e.g., SPK SUS ant in FIG. 13) using the first conductive plate 261 of the speaker assembly 260 as a radiator (e.g., using only the first conductive plate 261 of the speaker assembly 260 as a radiator).

An embodiment of the electronic device 101 according to the disclosure may include the housing 230, a circuit board (e.g., PCB 240), a first electronic component (e.g., the speaker assembly 260), the first conductive plate 261, and a first antenna (slot antenna). The housing 230 may include the support member 231 and the side frame 232 surrounding a periphery of the support member. The support member 231 may include two surfaces facing opposite directions. The support member 231 may include the first conductive area 231*a* in at least a portion of the support member 231.

The circuit board may be disposed on a surface of the support member 231 and include at least one feeding point (not shown) on a surface of the circuit board. The first electronic component may be disposed on the surface of the support member 231. The first conductive plate 261 may be disposed on a surface of the first electronic component. The first conductive area may be disposed between the first electronic component and the side frame, and include the first slot 2311 in at least a portion of the first conductive area. The first antenna may include a first radiator, the first feeding part 263, and the first signal terminal 262. The first radiator may include at least a portion of the first conductive area, where the portion of the first conductive area includes a peripheral portion of the first slot. The first feeding part may be coupled with the first conductive plate and electromagnetically coupled to the first radiator. The first signal terminal 262 may be coupled with the first conductive plate and electrically connected to the feeding point. The first electronic component may be disposed between at least a portion of the first conductive area and the circuit board.

According to an embodiment, the first feeding part may protrude (e.g., be formed to protrude) toward the first slot from an area of the first conductive plate adjacent to the first slot.

According to an embodiment, the first antenna may include at least a portion of the first conductive plate transmitting a wireless communication signal transmitted to or received from the first radiator, where the portion of the first conductive plate is between the first feeding part and the first signal terminal.

According to an embodiment, the electronic device 101 may further include the second electronic component (e.g., motor assembly 270) disposed adjacent to the first electronic component on the surface of the support member 231, and the electronic device 101 may include the second conductive plate 271 disposed on a surface of the second electronic component.

According to an embodiment, the first conductive area may be disposed between the first electronic component and the first sidewall (e.g., +X direction frame) of the side frame. The first electronic component and the circuit board may face the second sidewall (e.g., −Y direction frame) of the side frame extending the first sidewall, and at least the portion of second sidewall intersects the first sidewall.

According to an embodiment, the first conductive area extends (e.g., may be formed to extend) from a portion of the support member 231 facing the second sidewall to a portion of the support member 231 facing the first sidewall. An end of the first slot may be disposed between the first electronic component and the second sidewall.

According to an embodiment, the first conductive area may include an area disposed between the first sidewall of the support member 231 and the first electronic component. The other end of the first slot may be disposed between the first sidewall and the first electronic component.

According to an embodiment, the first conductive area may be formed to extend to an area disposed between at least the first sidewall of side frame and the second electronic component. The other end of the first slot may be disposed between the first sidewall and the second electronic component.

According to an embodiment, the first conductive area may include the (1-2)$^{th}$ conductive area 231*b* at least partially disposed between the first sidewall and the second electronic component. The (1-2)$^{th}$ conductive area may include the second slot 2312 formed in an area spaced apart from the first slot and closer to the second electronic component than to the first electronic component. Expressed another way, a second distance between the second slot 2312 and the second electronic component may be less than a first distance between the second slot 2312 and the first electronic component.

According to an embodiment, the electronic device 101 may further include a second antenna (slot antenna). The second conductive plate may be electrically connected to the first conductive plate. The second antenna may include a second radiator, a second feeding part, and/or the first signal terminal. The second radiator may include at least a portion of the (1-2)$^{th}$ conductive area, where the portion of the (1-2)$^{th}$ conductive area includes a peripheral portion of the second slot. The second feeding part may be coupled with the second conductive plate and electromagnetically coupled to the second radiator.

According to an embodiment, the second feeding part may protrude toward the second slot from an area of the first conductive plate adjacent to the second slot.

According to an embodiment, the circuit board may include at least one radiation conductor on a surface of circuit board facing the second conductive plate. The second conductive plate may be electrically connected to each of the first conductive plate and the at least one radiation conductor.

According to an embodiment, the second conductive plate may include at least one second feeding part formed to protrude toward the radiation conductor. The circuit board may further include at least one connection member disposed on the surface of the circuit board and electrically connecting the at least one second feeding part and the at least one radiation conductor.

According to an embodiment, the electronic device 101 may further include a third antenna. The third antenna may include the at least one radiation conductor, the at least one connection member, and the first signal terminal.

According to an embodiment, the first electronic component may include a speaker assembly, and the second electronic component may include a motor assembly.

An embodiment of the electronic device 101 according to the disclosure may include the housing 230, the circuit board 340, a first electronic component (e.g., the speaker assembly 260), the first conductive plate 261, and a first antenna (slot antenna). The housing may include the support member 231 and the side frame 232 surrounding a periphery of the support member 231. The support member 231 may include two sides facing opposite directions. The support member 231 may include the first conductive area 231*a* in at least a portion thereof.

The circuit board may be disposed on a surface of the support member 231 and include at least one feeding point on a surface of the circuit board. The first electronic component may be disposed on a surface of the support member 231. The first conductive plate 261 may be disposed on a surface of the first electronic component. The first conductive area may be disposed between the first electronic component and the side frame and include the first slot 2311 formed in at least a portion of the first conductive area.

The first antenna may include a first radiator, the first feeding part 263, and the first signal terminal 262. The first radiator may include at least a portion of the first conductive area, where the portion of the first conductive area includes a peripheral portion of the first slot. The first feeding part may be coupled with the first conductive plate and electromagnetically coupled to the first radiator. The first signal terminal may be coupled with the first conductive plate and electrically connected to the feeding point. The first electronic component may be disposed between at least a portion of the first conductive area and the circuit board. The first antenna may include at least a portion of the first conductive plate transmitting a wireless communication signal transmitted to or received from the first radiator, where the portion of the first conductive plate is between the first feeding part and the first signal terminal.

According to an embodiment, the electronic device 101 may further include the second electronic component (e.g., motor assembly 270) disposed adjacent to the first electronic component on the surface of the support member 231, and the second conductive plate 271 disposed on a surface of the second electronic component.

According to an embodiment, the first conductive area may be disposed between the first electronic component and the first sidewall (e.g., +X direction frame) of the side frame. The first electronic component and the circuit board may face the second sidewall (e.g., −Y direction frame) of the side frame extending from the first sidewall, and at least portion of the second sidewall intersects the first sidewall.

According to an embodiment, the first conductive area may include the (1-2)$^{th}$ conductive area 231*b* at least partially disposed between the first sidewall and the second electronic component. The (1-2)$^{th}$ conductive area may include the second slot 2312 formed in an area spaced apart from the first slot and closer to the second electronic component than to the first electronic component. Expressed another way, and a second distance between the second slot and the second electronic component is less than a first distance between the second slot and the first electronic component.

According to an embodiment, the electronic device 101 may further include a second antenna (slot antenna). The second conductive plate may be electrically connected to the first conductive plate. The second antenna may include a second radiator, a second feeding part, and/or a first signal terminal. The second radiator may include at least a portion of the (1-2)$^{th}$ conductive area, where the portion of the (1-2)$^{th}$ conductive area includes a peripheral portion of the second slot. The second feeding part may be coupled with the second conductive plate and electromagnetically coupled to the second radiator.

It is to be understood that the problems to be solved by the disclosure are not limited to the problems described herein, and may be extended in various ways without departing from the scope and spirit of the disclosure.

According to an embodiment of the electronic device 101, an antenna using a conductive area of a support member 231 as a radiator is provided inside an electronic device 101 to suppress communication failure and the degradation of call quality caused by external static electricity and/or hand gripping of the outer surface of the electronic device 101, compared to a metal antenna using a side frame forming the outer surface of an electronic device as a radiator.

Effects achievable from the disclosure are not limited to the above-described ones, and other unmentioned effects may be understood by those skilled in the art from the following description.

While an embodiment of the disclosure has been described by way of example, it should be understood that the embodiment is only illustrative, not limiting the disclosure. It will be apparent to those skilled in the art that various variations can be made to the disclosure in terms of form and details without departing from the scope of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to embodiments supported by the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the or more instructions stored in the storage medium, and execute it, with or without using one or more other components under the control of the processor. This allows the machine to be operated to perform at least one function according to the at least one instruction invoked. The or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a housing comprising a support member and a side frame surrounding a periphery of the support member, wherein the support member comprises two surfaces facing opposite directions and a first conductive area in at least a portion of the support member;

a circuit board disposed on a surface of the support member and comprising at least one feeding point;

a first electronic component disposed on the surface of the support member;

a first conductive plate disposed on a surface of the first electronic component; and a first antenna, wherein the first conductive area is disposed between the first electronic component and the side frame and comprises a first slot configured on at least a portion of the first conductive area, wherein the first antenna comprises:

a first radiator comprising at least a portion of the first conductive area, wherein the portion of the first conductive area comprises a peripheral portion of the first slot;

a first feeding part coupled with the first conductive plate and electromagnetically coupled to the first radiator; and a first signal terminal coupled with the first conductive plate and electrically connected to the at least one feeding point, and wherein at least a portion of the first electronic component is disposed between the first conductive area and the circuit board.

2. The electronic device of claim 1, wherein the first feeding part protrudes toward the first slot from an area of the first conductive plate adjacent to the first slot.

3. The electronic device of claim 1, wherein the first antenna comprises at least a portion of the first conductive plate transmitting a wireless communication signal transmitted to or received from the first radiator between the first feeding part and the first signal terminal.

4. The electronic device of claim 1, wherein the first conductive area is disposed between the first electronic component and a first sidewall of the side frame, and wherein the first electronic component and the circuit board face a second sidewall of the side frame extending from the first sidewall, and at least portion of the second sidewall intersects the first sidewall.

5. The electronic device of claim 4, wherein the first conductive area extends from a portion of the support member facing the second sidewall to a portion of the support member facing the first sidewall, and wherein an end of the first slot is disposed between the first electronic component and the second sidewall.

6. The electronic device of claim 5, wherein another end of the first slot is disposed between the first sidewall and the first electronic component.

7. The electronic device of claim 4, wherein the circuit board comprises at least one radiation conductor on a surface of the circuit board facing the second conductive plate, and wherein the second conductive plate is electrically connected to the first conductive plate and the at least one radiation conductor.

8. The electronic device of claim 7, wherein the second conductive plate comprises at least one second feeding part protruding toward the at least one radiation conductor, and wherein the circuit board further comprises at least one connection member disposed on the surface of the circuit board and electrically connecting the at least one second feeding part and the at least one radiation conductor.

9. The electronic device of claim 8, further comprising a third antenna, wherein the third antenna comprises the at least one radiation conductor, the at least one connection member, and the first signal terminal.

10. The electronic device of claim 4, wherein the first electronic component comprises a speaker assembly, and the second electronic component comprises a motor assembly.

11. The electronic device of claim 1, further comprising:

a second electronic component disposed adjacent to the first electronic component on the surface of the support member; and a second conductive plate disposed on a surface of the second electronic component.

12. The electronic device of claim 11, wherein the first conductive area extends to an area disposed between at least a first sidewall of the side frame and the second electronic component, and wherein an end of the first slot is disposed between the first sidewall and the second electronic component.

13. The electronic device of claim 11, wherein the first conductive area comprises a $(1\text{-}2)^{th}$ conductive area at least partially disposed between a first sidewall of the side frame and the second electronic component, and wherein the $(1\text{-}2)^{th}$ conductive area comprises a second slot formed in an area spaced apart from the first slot, and a second distance between the second slot and the second electronic component is less than a first distance between the second slot and the first electronic component.

14. The electronic device of claim 13, further comprising a second antenna, wherein the second conductive plate is electrically connected to the first conductive plate, and wherein the second antenna comprises:

a second radiator comprising at least a portion of the $(1\text{-}2)^{th}$ conductive area, wherein the portion of the $(1\text{-}2)^{th}$ conductive area comprises a peripheral portion of the second slot;

a second feeding part coupled with the second conductive plate and electromagnetically coupled to the second radiator; and the first signal terminal.

15. The electronic device of claim 14, wherein the second feeding part protrudes toward the second slot from an area of the first conductive plate adjacent to the second slot.

16. An electronic device comprising:

a housing comprising a support member and a side frame surrounding a periphery of the support member, wherein the support member comprises two sides facing opposite directions and a first conductive area in at least a portion of the support member;

a circuit board disposed on a surface of the support member and comprising at least one feeding point on a surface of the circuit board;

a first electronic component disposed on the surface of the support member;

a first conductive plate disposed on a surface of the first electronic component; and a first antenna, wherein the first conductive area is disposed between the first electronic component and the side frame and comprises a first slot formed in at least a portion of the first conductive area, and wherein the first antenna comprises:

a first radiator comprising at least a portion of the first conductive area, wherein the portion of the first conductive area comprises a peripheral portion of the first slot;

a first feeding part coupled with the first conductive plate and electromagnetically coupled to the first radiator;

a first signal terminal coupled with the first conductive plate and electrically connected to the at least one feeding point; and at least a portion of the first conductive plate transmitting a wireless communication signal transmitted to or received from the first radiator, wherein the portion of the first conductive plate is between the first feeding part and the first signal terminal.

17. The electronic device of claim 16, further comprising:

a second electronic component disposed adjacent to the first electronic component on the surface of the support member; and a second conductive plate disposed on a surface of the second electronic component.

18. The electronic device of claim 17, wherein the first conductive area is disposed between the first electronic component and a first sidewall of the side frame, and wherein the first electronic component and the circuit board face a second sidewall of the side frame extending from the first sidewall, and at least portion of the second sidewall intersects the first sidewall.

19. The electronic device of claim 18, wherein the first conductive area comprises a $(1\text{-}2)^{th}$ conductive area at least partially disposed between the first sidewall and the second electronic component, and wherein the $(1\text{-}2)^{th}$ conductive area comprises a second slot formed in an area spaced apart from the first slot, and a second distance between the second slot and the second electronic component is less than a first distance between the second slot and the first electronic component.

20. The electronic device of claim 19, further comprising a second antenna, wherein the second conductive plate is electrically connected to the first conductive plate, and wherein the second antenna comprises:

a second radiator comprising at least a portion of the $(1\text{-}2)^{th}$ conductive area, wherein the portion of the $(1\text{-}2)^{th}$ conductive area comprises a peripheral portion of the second slot;

a second feeding part coupled with the second conductive plate and electromagnetically coupled to the second radiator; and the first signal terminal.

* * * * *